United States Patent [19]

Bolosky et al.

[11] Patent Number: 5,926,474
[45] Date of Patent: *Jul. 20, 1999

[54] PROTECTION AGAINST MULTIPLE SENDERS IN A MULTIPOINT TO POINT DATA FUNNEL

[75] Inventors: William J. Bolosky, Issaquah; Yoram Bernet, Seattle, both of Wash.

[73] Assignee: Microsoft Corporation, Redmond, Wash.

[*] Notice: This patent is subject to a terminal disclaimer.

[21] Appl. No.: 08/668,651

[22] Filed: Jun. 6, 1996

Related U.S. Application Data

[63] Continuation-in-part of application No. 08/280,190, Jul. 25, 1994, Pat. No. 5,583,868.

[51] Int. Cl.⁶ .................................................. H04L 12/56
[52] U.S. Cl. .......................... 370/394; 370/397; 370/450
[58] Field of Search .................................. 370/538, 453, 370/450, 394; 340/825.51; 348/7

[56] References Cited

U.S. PATENT DOCUMENTS

| | | | |
|---|---|---|---|
| 3,781,818 | 12/1973 | Pardoe et al. | 370/538 |
| 5,206,638 | 4/1993 | Mckeown | 340/825.51 |
| 5,243,335 | 9/1993 | Kato et al. | 370/453 |
| 5,287,348 | 2/1994 | Schmidt et al. | 370/60.1 |
| 5,339,317 | 8/1994 | Tanaka et al. | 370/85.15 |
| 5,345,447 | 9/1994 | Noel | 370/67 |
| 5,359,600 | 10/1994 | Ueda et al. | 370/60.1 |
| 5,426,638 | 6/1995 | Maruyama et al. | 370/450 |
| 5,473,362 | 12/1995 | Fitzgerald et al. | 348/7 |
| 5,497,374 | 3/1996 | Maruyama et al. | 370/450 |
| 5,583,868 | 12/1996 | Rashid et al. | 370/394 |
| 5,606,359 | 2/1997 | Youden et al. | 348/7 |

OTHER PUBLICATIONS

Couloris, George F., and Jean Dollimore, "Distributed Systems—Concepts and Design," Addison–Wesley Publishing Company, 1988, pp. 66, 67, 73, 74.

Newman, Peter "ATM Technology for Corporate Networks," IEEE Communications Magazine, Apr., 1992, pp. 90–101.

Lane, Jim, "Asynchronous Transfer Mode: Bandwidth for the Future," Telco Systems, First Edition, 1992, pp. 1–37.

Breault, et al., (eds.), "ATM User–Network Interface Specification," The ATM Forum, Version 2.4, Aug. 5, 1993, pp. 1–346.

*Primary Examiner*—Tod R. Swann
*Assistant Examiner*—Fred F. Tzeng
*Attorney, Agent, or Firm*—Lee & Hayes, PLLC

[57] ABSTRACT

A system includes protection against multiple senders in a multipoint to point data funnel that connects multiple data sources with a single data sink. The protection is afforded by employing tokens and by adopting a token protocol. In particular, a data source must be in possession of a token in order to send data on to a data funnel. The token exhibits that the data source has permission to output the data to the data funnel. The system may operate in the scheduled mode of operation where the system knows a priori when each data source will send data over the data funnel for a data sequence. The system may also operate in a nonscheduled mode where multiple data sources have data that they wish to send but the schedule of data transmissions from the data sources is not known a priori. The token protocol is adaptable to both scheduled mode and nonscheduled mode of operation. The token protocol also facilitates regeneration of tokens if tokens do not arrive at a destination that expects a token within a predetermined period of time.

32 Claims, 37 Drawing Sheets

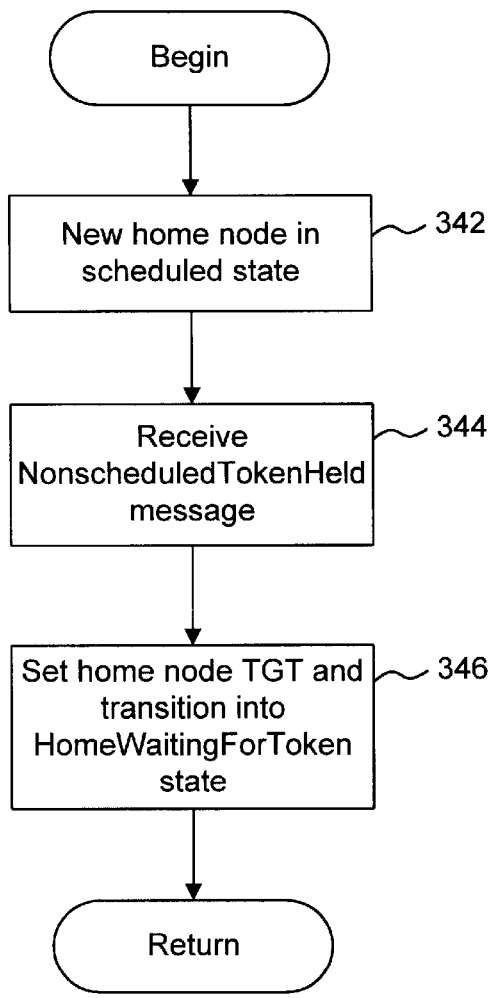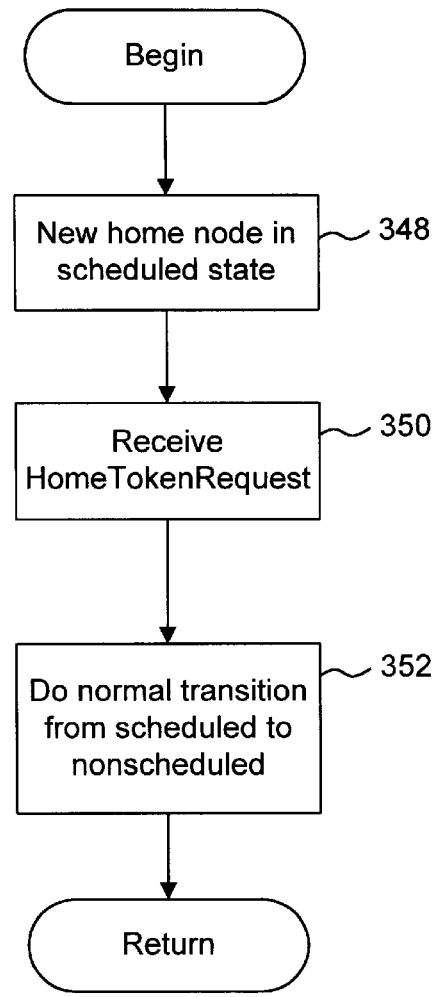
*FIG. 28A*  *FIG. 28B*

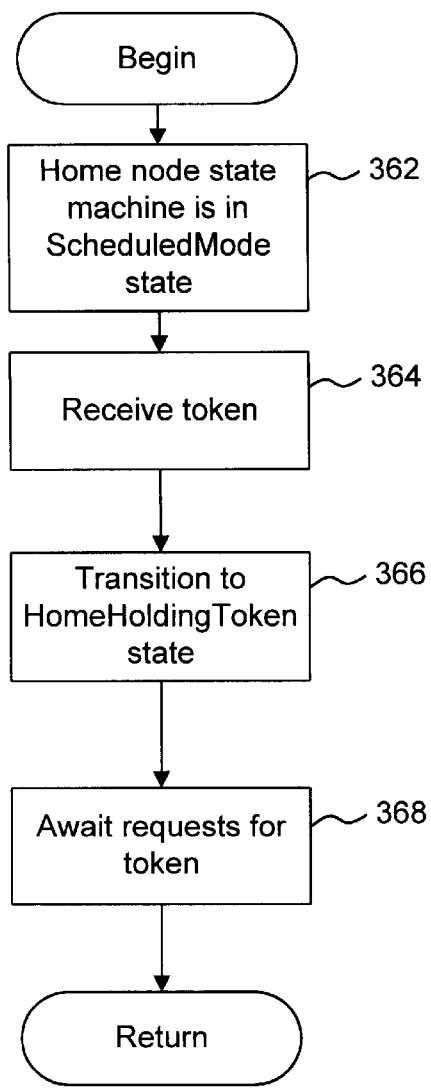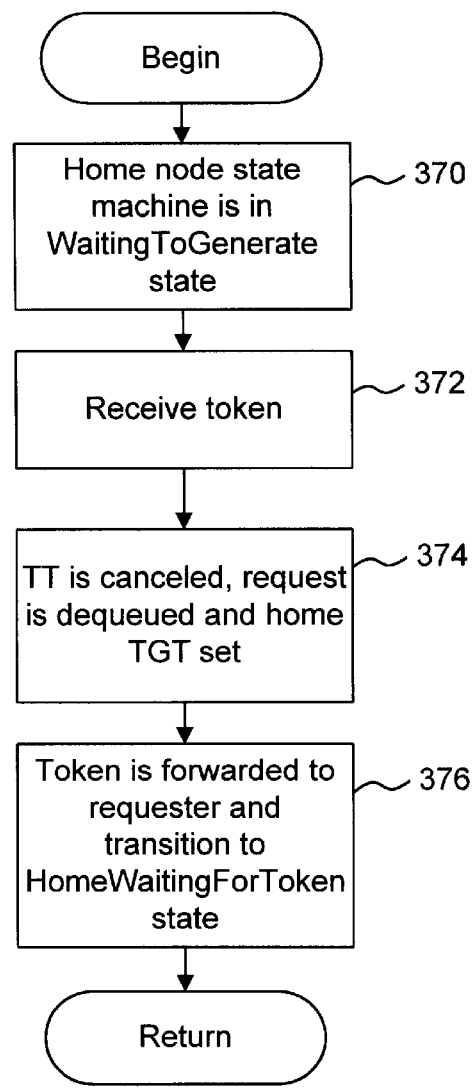
FIG. 30
FIG. 31

PROTECTION AGAINST MULTIPLE SENDERS IN A MULTIPOINT TO POINT DATA FUNNEL

REFERENCE TO RELATED APPLICATIONS

This is a continuation-in-part of U.S. patent application Ser. No. 280,190, filed Jul. 25, 1994, which issued as U.S. Pat. No. 5,583,868, on Dec. 10, 1996.

TECHNICAL FIELD

The present invention relates generally to computer systems and more particularly to protection against multiple senders in a system that employs a multipoint to point data funnel.

BACKGROUND OF THE INVENTION

When a data sequence is to be transmitted from a data source to a destination, there are a number of available alternatives. The first alternative is to transmit the entire data sequence as a continuous stream over a communication path that connects the data source with the destination. Unfortunately, such an approach can prove troublesome when the data sequence is quite large because the transmission may monopolize the communication path. This problem is heightened when the communication path is shared by multiple entities. Another alternative is to divide the data sequence into blocks and to transmit the data sequence a block at a time from the data source to the destination. In some instances, data blocks for the data sequence may be stored on multiple storage devices. A complication that arises in such situations is how to assure that the data blocks are transmitted from the appropriate devices in the proper sequence over the communication path. One possible problem is that multiple storage devices will output blocks of data of the data sequence at the same time.

SUMMARY OF THE INVENTION

In accordance with the first aspect of the present invention, a method is practiced in a computer system that has data sources for outputting data to a data sink. A data funnel connects the data sources with the data sink. A home node is provided in the computer system for regulating the output of the data by the data sources to the data funnel. In accordance with this method, a token is requested at a selected one of the data sources from the home node to permit the selected data source to output data to the data sink through the data funnel. A token is forwarded from the home node to the selected data source and data is output from the selected data source to the data sink through the data funnel after the token is received at the selected data source.

In accordance with another aspect of the present invention, a computer system includes a plurality of data servers that are connected to a client via a data funnel. A method is practiced on the computer system wherein the system is operated in a scheduled mode of operation such that data blocks are output from the data servers to the data funnel in a sequence according to a predetermined schedule. This system is also operated in a nonscheduled mode of operation such that data blocks are output in a nonscheduled fashion. Each data server must request and receive permission to output data before the data may be output from the data server in the nonscheduled mode of operation.

In accordance with a further aspect of the present invention, the arrival of a token is awaited at a given data output component for a predetermined period of time. Where the token fails to arrive within the predetermined period of time, a new token is generated at the given data output component. The new token is used to output data from the given data output component to a connection mechanism that connects the given output data component with a destination.

BRIEF DESCRIPTION OF THE DRAWINGS

A preferred embodiment of the present invention will be described in more detail below relative to the following figures.

FIG. 28A is a flowchart illustrating the steps that are performed at a new home node when a NonscheduledTokenHeldMessage is received.

FIG. 28B is a flowchart illustrating the steps that are performed when a request for a token is received at a new home node while the new home node is still operating in scheduled mode.

FIG. 30 is a flowchart illustrating the steps that are performed when a token is received by a home node state machine that is in a ScheduledMode state.

FIG. 31 is a flowchart illustrating the steps that are performed when a token is received while the home node state machine is in a WaitingToGenerate state.

DETAILED DESCRIPTION OF THE INVENTION

The preferred embodiment of the present invention provides protection against multiple senders in a multipoint to point data funnel that connects multiple data sources with a single data sink. The protection is afforded by employing tokens and by adopting a token protocol. A data source or data output component must be in possession of or own a token in order to send data onto a data funnel. Thus, the token serves as evidence of permission to output data. Protection against multiple senders is largely achieved by ensuring that in most instances the token is possessed by at most one data source at a time, and by passing the token on to a next data source only after completion of the sending of data. The preferred embodiment of the present invention does not provide absolute protection against multiple senders but rather will tolerate multiple senders in certain situations. Nevertheless, the preferred embodiment of the present invention prevents deadlocks from arising in the sending of data over data funnels.

The protocol adopted by the preferred embodiment of the present invention facilitates a scheduled mode of operation and a nonscheduled mode of operation. In the scheduled mode, the sending of data is scheduled such that the system knows a priori when each data source will send data over a data funnel for a data sequence. In contrast, in nonscheduled mode, multiple data sources have data that they wish to send, but it is not known a priori which data source will send data and when each data source will send data. In general, each data source wishes to send out its data as quickly as possible. As will be described in more detail below, the preferred embodiment of the present invention provides separate state machines for the respective scheduled and nonscheduled modes.

The preferred embodiment of the present invention provides a mechanism for regenerating tokens if tokens do not arrive at a destination that expects a token within a predetermined period of time. The preferred embodiment of the present invention seeks to minimize late delivery and to be robust. The ability to regenerate tokens if the tokens do not arrive within a fixed period of time helps to ensure timely delivery and bolster the robustness of the system.

System Overview

Figure 1:
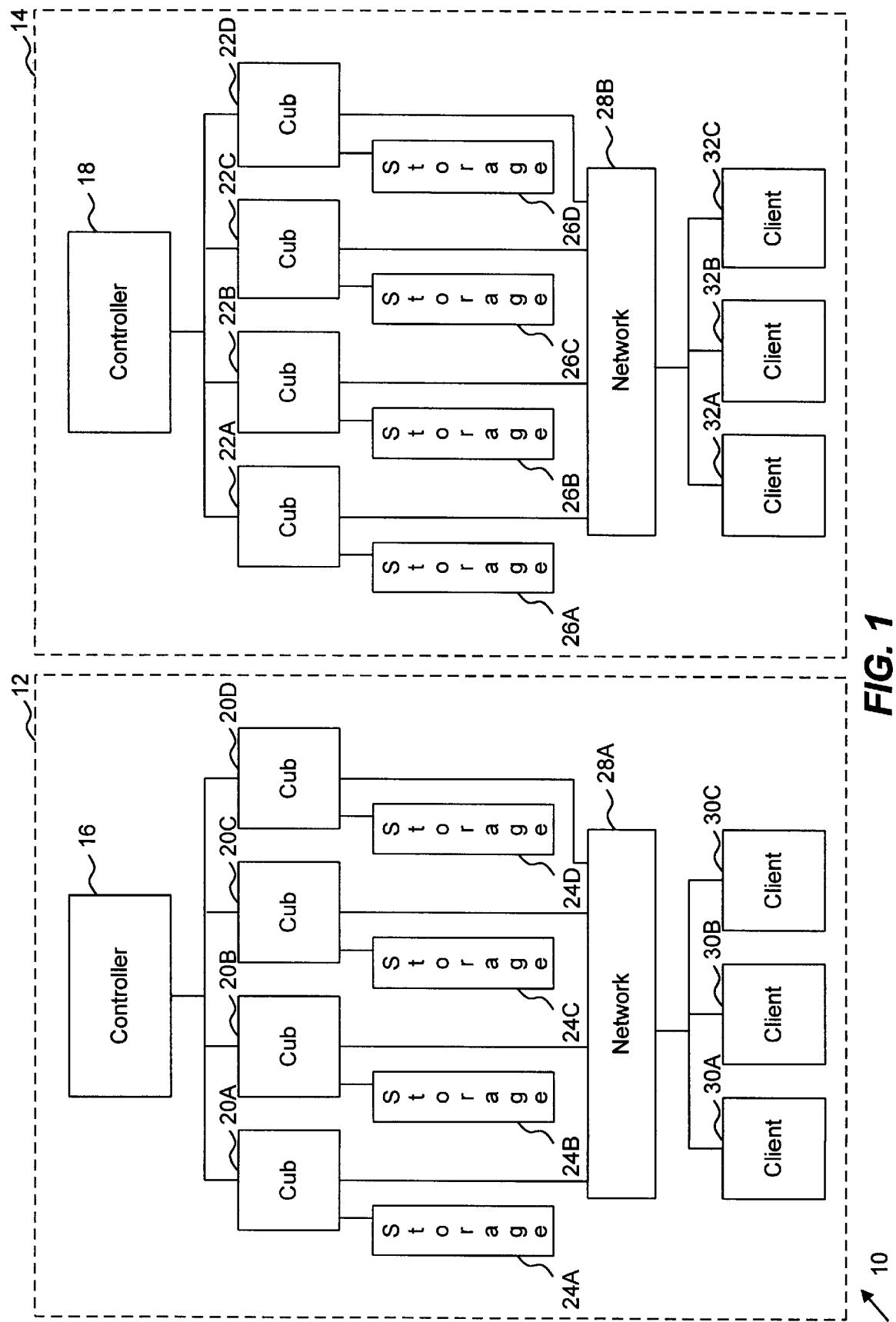
FIG. 1 is a block diagram of a system that is suitable for practicing the preferred embodiment of the present invention.

FIG. 1 is a block diagram of a system 10 that is suitable for practicing the preferred embodiment to the present invention. The system is generally suitable for providing data sequences from servers to destinations. For example, the system may provide a video on demand service or other real-time subscriber services. The system 10 includes two subsystems 12 and 14. Although two subsystems 12 and 14 are depicted in FIG. 1, those skilled in the art will appreciate that the present invention may be practiced with a single subsystem or in a system that employs more than two subsystems. The choice of two subsystems is intended to be merely illustrative.

Each subsystem 12 and 14 includes a controller 16 and 18 for controlling the operation of data servers 20A, 20B, 20C, 20D and 22A, 22B, 22C, 22D, respectively. These data servers may be conventional file servers or other computer systems. The data servers are referred to hereinafter as "cubs." The depiction of four cubs per controller is merely for illustrative purposes. The present invention is not limited to the use of four cubs per controller. Each cub 20A, 20B, 20C, 20D, 22A, 22B, 22C and 22D has an associated storage 24A, 24B, 24C, 24D, 26A, 26B, 26C and 26D. The storage need not consist of a single storage device but rather may include multiple storage devices. Moreover, the form of the storage device may vary. For example, the storage devices may be magnetic disk drives, optical disk drives or other types of storage devices. The storages 24A, 24B, 24C, 24D and 26A, 26B, 26C, 26D hold data that is to be transmitted over respective networks 28A and 28B to respective clients 30A, 30B, 30C and 32A, 32B, 32C. The data may be any of a number of different types, including software. In the preferred embodiment to the present invention, the data is multimedia data, such as an audio visual sequence.

In order to provide parallelism and load balancing among clients, the preferred embodiment to the present invention stores its data across multiple ones of the storages 24A, 24B, 24C, 24D and 26A, 26B, 26C and 26D. In particular, data is striped across the storages for a group of cubs that share a common controller such that successive sequential blocks of an audiovisual data sequence are stored on successive storage devices in a predefined sequence. Hence, a first block of a data sequence may be stored on storage 24A under the control of cub 20A. A next block may be stored on storage 24B under control of cub 20B and a third sequential block may be stored on storage 24C under the control of cub 20C. A fourth sequential block may be stored on storage 24D under the control of cub 20D and a fifth block may be stored on storage 24A under the control of cub 20A. Successive blocks are striped in a like fashion. In the preferred embodiment to the present invention, the blocks are fixed size in order to simplify management of the system 10. Nevertheless, the present invention may also be practiced with instances where the blocks are variable sized.

The cubs 20A, 20B, 20C, 20D and 22A, 22B, 22C and 22D output their respective blocks over networks 28A and 28B, respectively. The networks 28A and 28B may be part of a single larger network and may take different forms. One suitable form for the networks 28A and 28B is an asynchronous transfer mode (ATM) network that employs ATM switches. The data blocks from the cubs 20A, 20B, 20C, 20D and 22A, 22B, 22C and 22D are combined by the switches in the respective networks 28A and 28B to produce a single continuous output data stream that is passed to a client. The switches create a multipoint to point data funnel that delivers data to a single point. An example is helpful to illustrate the data funnel concept. Suppose that the system 10 shown in FIG. 1 is used to provide video on demand service to a subscriber. The movie that a subscriber wishes to view constitutes an audio/visual data sequence that is striped across a number of storage devices. Suppose that client 30A is a subscriber to the video on demand service and wishes to view a movie that is striped across storages 24A, 24B, 24C and 24D. In a first time interval, a block of data for the movie stored on storage 24A is output by cub 20A to the network 28A. In a next time period, a next block of the movie stored on storage 24B is output by cub 20B to the network 28A. Similarly, in a next time period, a block of the movie stored on storage 24C is output by cub 20C to the network 28A. The ATM switches within the network 28A combine the data from multiple data sources to deliver the data in a single continuous sequence to the client 30A.

The above, described approach assumes that, in general, only one of the cubs will output a block of the data sequence at a time. In addition, the above approach assumes that the data blocks will be passed to the network in the order in which they are to be received by the client. If multiple senders send blocks of the data sequence in an overlapping or concurrent fashion, problems arise. The protocol and the use of tokens help to eliminate such problems. A cub must possess or own a token for the outputting of a data sequence before it may output a block of the data sequence. Only when the cub has completed its sending of a block will the cub pass the token on to the next cub that is to output a data block of the data sequence.

Figure 2:
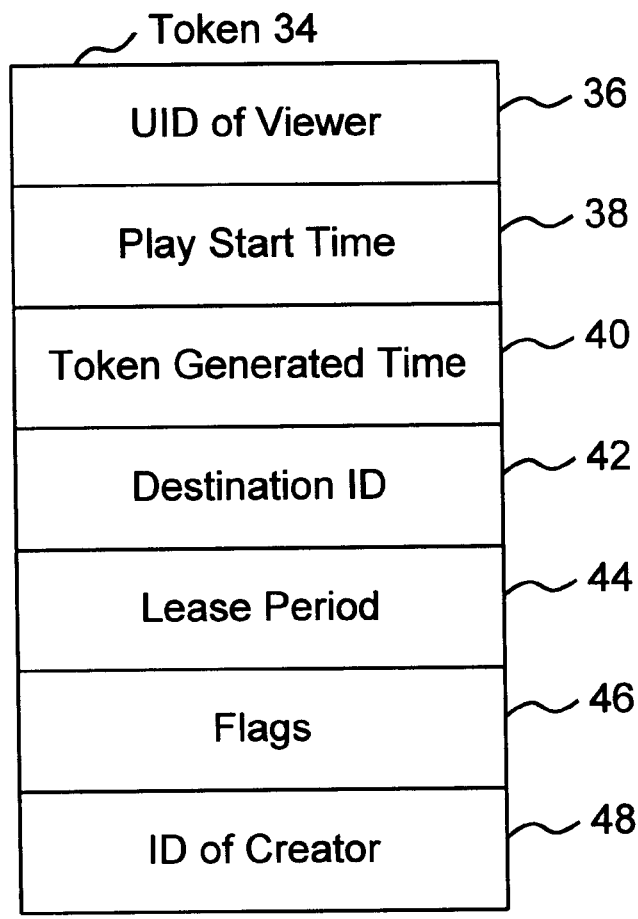
FIG. 2 is a diagram illustrating the format of a token in accordance with the preferred embodiment of the present invention.

FIG. 2 shows a diagram of the format of a token 34. In the preferred embodiment of the present invention, the token is implemented as a data structure having multiple fields. Those skilled in the art will appreciate that the token need not be implemented with the format depicted in FIG. 2 but may also be implemented using other formats. Furthermore, the token need not be implemented as a data structure but rather may be implemented as a message or other alternative.

The token 34 includes a field 36 that holds a universal identifier (UID) of the viewer (i.e., client) which is to receive the data of the data sequence associated with the token. The token also includes a field 38 that holds the play start time for the data sequence. The play start time is the time at which the client's request for the data is received at the controller. The token 34 holds a field 40 that holds the token generated time, which identifies the time at which the token was created. The value held in field 40 is used to determine whether the token is stale or not, as will be described in more detail below.

Field 42 of the token 34 holds a destination I.D. that is mappable to a server address. Field 44 holds a value for the lease period for the token which indicates the duration of time for which a token is leased out to a cub when operating in nonscheduled mode. Field 46 holds a number of different flags, and field 48 holds an identifier (I.D.) of the cub which created the token. The flags field 46 of the token 34 include flags that designate whether the token is for scheduled mode or nonscheduled mode, whether the token is destined for a home node or standard state machine and whether the token is retired.

Figure 3:
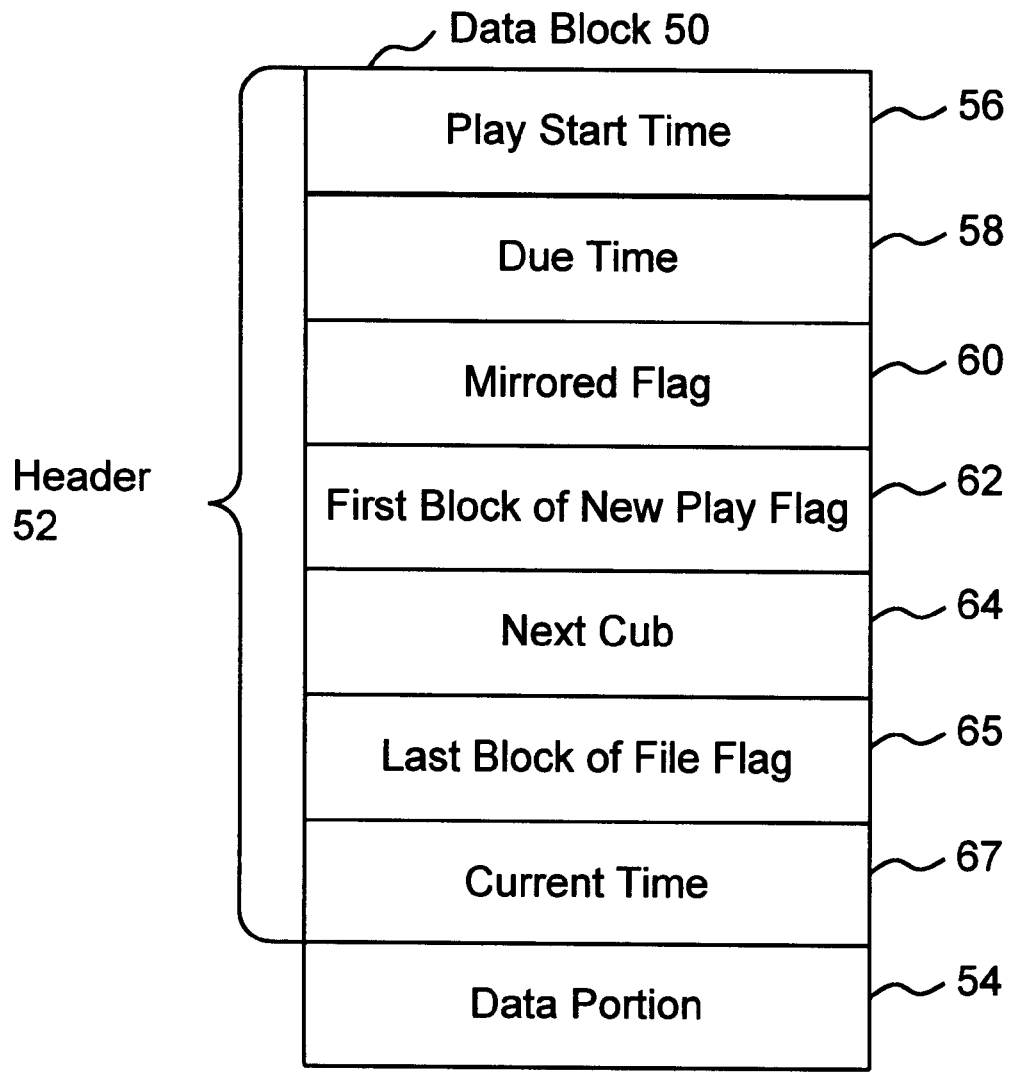
FIG. 3 is a diagram illustrating the format of a data block in accordance with the preferred embodiment of the present invention.

FIG. 3 depicts the format for a data block 50. Each data block 50 includes a header 52 and a data portion 54. The header 52 holds header information, whereas the data portion 54 holds the data for the data block. The header 52 includes a field 56 that holds the play start time for the data sequence in which the data block 50 is included. Field 58 of the header 52 holds the due time at which the block must be delivered to the network. Field 60 of the header 52 specifies whether the block is a mirrored block or not. The use of mirroring will be described in more detail below. Field 62 of the header specifies whether the block is the first block of a new play sequence, and field 64 holds an identifier for the next cub which is to output a block in the data sequence. Field 65 holds a flag that indicates whether the block is a last block of a scheduled play. Field 67 holds a value that specifies the current time that is used to synchronize time between the user level and the kernel level, which will be described in more detail below.

Figure 4:
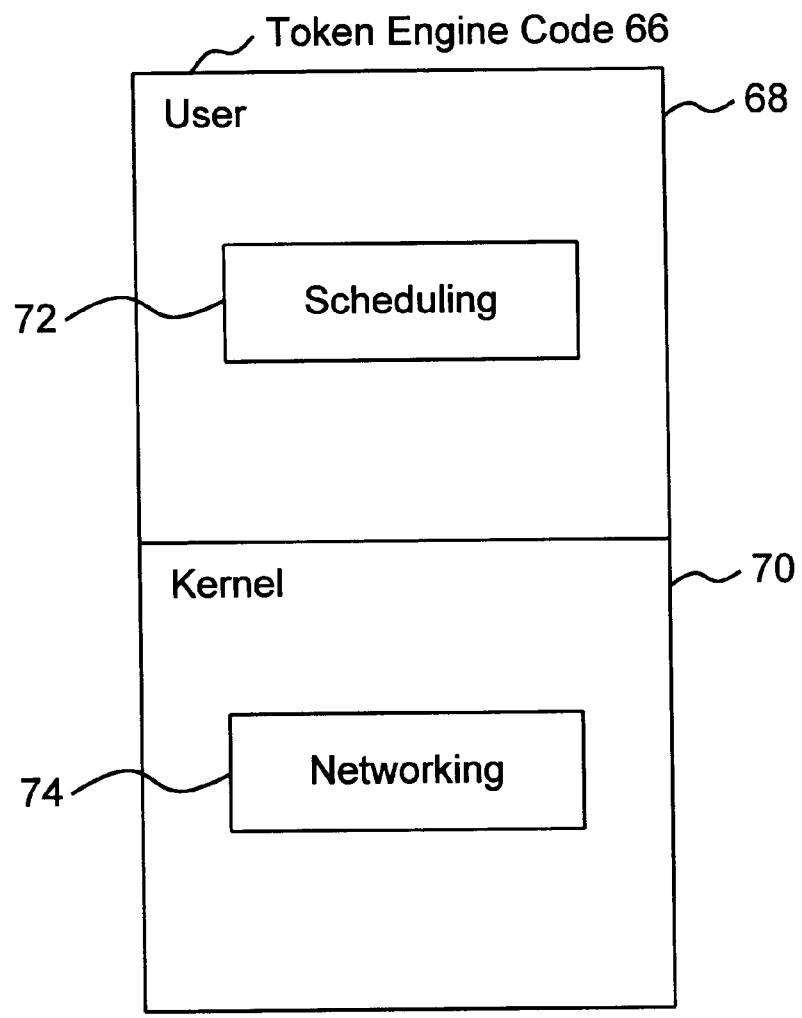
FIG. 4 is a diagram illustrating components of token engine code used in the preferred embodiment of the present invention.

The preferred embodiment of the present invention is implemented largely by a token engine (which will be described in more detail below). As shown at FIG. 4, the token engine code 66 may be partitioned into user level code 68 and kernel code 70. With respect to the preferred embodiment of the present invention, code in the token engine relating to scheduling 72 is part of the user level code 68, while code in the token engine related to networking 74 is stored within the kernel 70.

Each data funnel to a client has a token state that is independent of other data funnels. As such, there is a separate token state for each data funnel. The token engine is implemented primarily by code in the kernel 70 on the cubs. An identical copy of the Kernel code 70 of the token engine runs on each of the cubs for each data funnel in the system. As mentioned above, the user mode portion 68 of the token engine code is run on cubs and largely allocates play start times that are used to differentiate which user request was responsible for a send on a cub. The role of the token engine is to receive a data block and to send the data block to the data funnel while possessing or owning the token. The token engine subsequently forwards the token to the next cub of the play sequence in scheduled mode or returns the token to a home node in nonscheduled mode.

Figure 5:
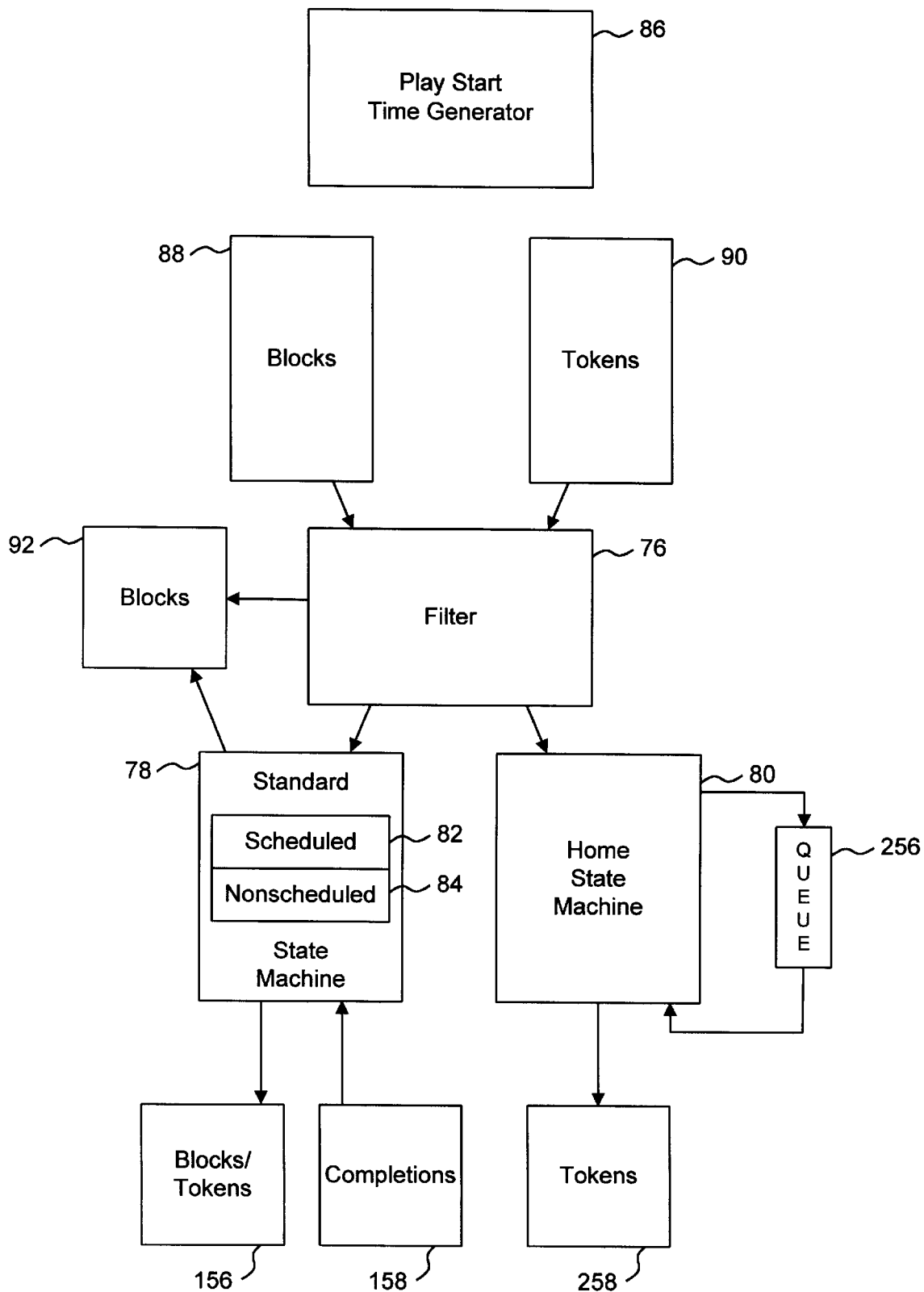
FIG. 5 is a block diagram illustrating components of the token engine of the preferred embodiment of the present invention.

FIG. 5 is a block diagram that depicts the basic structure of the token engine. The token engine includes a filter 76 for filtering out stale tokens or blocks that have been superseded by some action by the user or token engine. The filter 76 is connected to a standard state machine 78 and a home node state machine 80. Tokens are passed to the state machines 78 or 80 based on their specified destination I.D. The standard state machine includes a scheduled state machine 82 and a nonscheduled state machine 84. The scheduled state machine 82 and the nonscheduled state machine 84 may be implemented as separate state machines rather than as part of a single state machine. The scheduled state machine 82 is active in the scheduled mode of operation and the nonscheduled state machine is active in the nonscheduled mode of operation. The state machines 78 and 80 make transitions between states based upon events. The state machines take actions, such as sending a block to the network or forwarding a token to another cub, as they transition between states.

The token engine includes a play start time generator 86 that generates play start times for clients. In the preferred embodiment, the play start time generator 86 is part of the controller 16 or 18, but those skilled in the art will appreciate that the play start time generator 86 may be implemented in a distributed fashion. Each time that a user starts a scheduled play or switches from scheduled mode to nonscheduled mode, the play start time generator 86 updates the play start time for that client. The play start time generator 86 does not directly inform cubs of an updated play start time for a client. Instead, new play start times are lazily propagated to the cubs in that time the controller 16 or 18 specifies the current play start time when it forwards a request to a cub to implement a call from a client, such as a request to start playing. The cub uses the specified play start time in requests that it makes and this results in the filter's copy of the play start time being updated, as will be described in more detail below.

Figure 6:
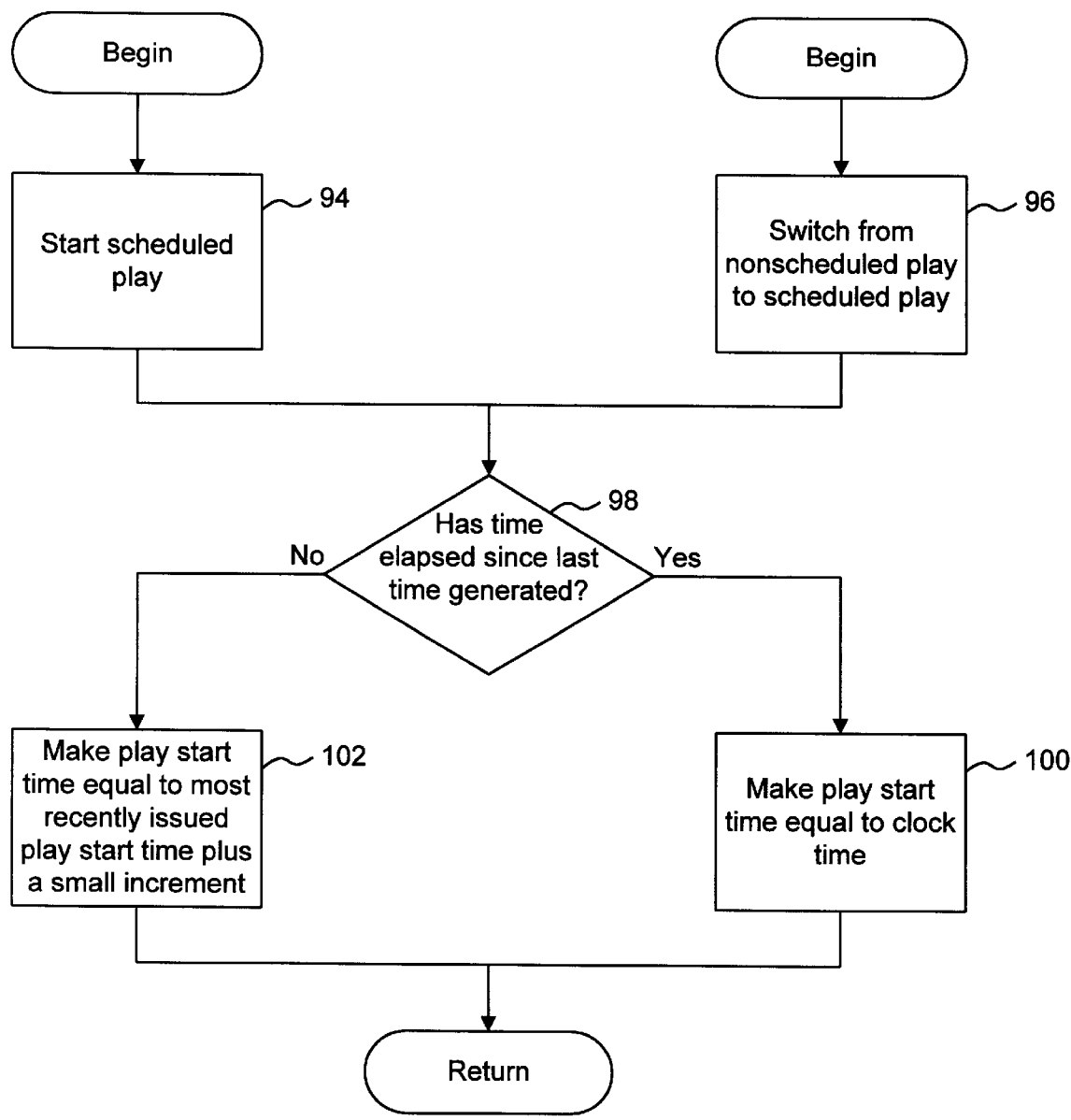
FIG. 6 is a flowchart illustrating the steps that are performed in assigning play start times.

FIG. 6 is a flowchart illustrating the steps that are performed by the preferred embodiment of the present invention in assigning play start times by the play start time generator 86. Initially, either a scheduled play has started (step 94 in FIG. 6) or a switch has been made from nonscheduled play mode to scheduled play mode (step 96 in FIG. 6). The play start time generator 86 then determines whether any time has elapsed, as measured by an internal clock that tracks the current time, since the last play start time was generated (step 98 in FIG. 6). If time has elapsed, the play start time is set equal to the current clock reading (step 100 in FIG. 6). In contrast, if no time has elapsed, the play start time is set equal to the most recently issued play start time plus a small increment that is of much smaller granularity than the clock's smallest measure of time (step 102 in FIG. 6). In an alternative embodiment, the play start is replaced by a strictly increasing serial number.

As was mentioned above, the role of the filter 76 is to process blocks 88 and tokens 90 to detect stale blocks and tokens and to discard such stale blocks and tokens. The filter 76 discards stale tokens and returns stale blocks 92 to their source. Before any of the state machines 78 and 80 may act on a token or block, the token or block must pass through the filter 76. This ensures that stale tokens and blocks do not cause undesirable actions to occur in the state machines 78 and 80.

Figure 7:
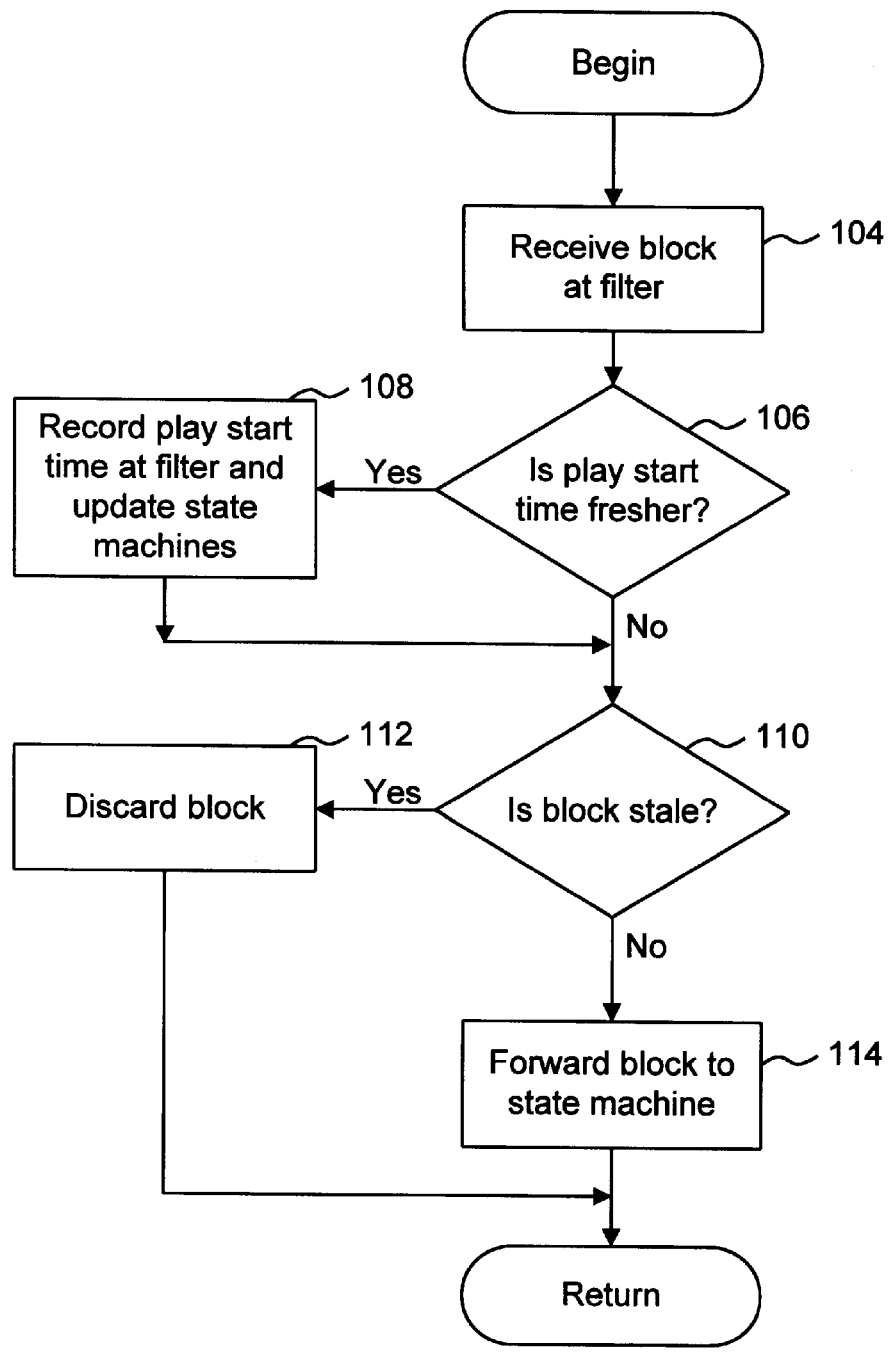
FIG. 7 is a flowchart illustrating the steps that are performed by a filter on blocks that are received by the token engine.

FIG. 7 is a flowchart illustrating the steps that are performed by the filter 76 in processing incoming blocks 88. A block 88 is received at the filter 76 that has been retrieved from the storage associated with the cub on which the token engine is largely running (step 104 in FIG. 7), and the filter determines whether the play start time in field 56 of the header 52 of the block is more current than the latest play start time recorded at the filter 76 (step 106 in FIG. 7). If the play start time in the block is more current, the filter 76 records the new play start time and generates events for updating the state machines 78 and 80 (step 108 in FIG. 7). As will be described in more detail below, the filter 76 generates an UpdatePST event. The filter 76 then determines whether or not the block is stale (step 110 in FIG. 7). The test for determining whether or not a block is stale is quite straightforward. Specifically, the play start time of the data block is compared to the play start time recorded at the filter 76. If the block is determined to be stale, the block is discarded by returning it to its source (step 112 in FIG. 7). If the block is not stale, it is forwarded to the appropriate state machine (step 114 in FIG. 7).

Figure 8:
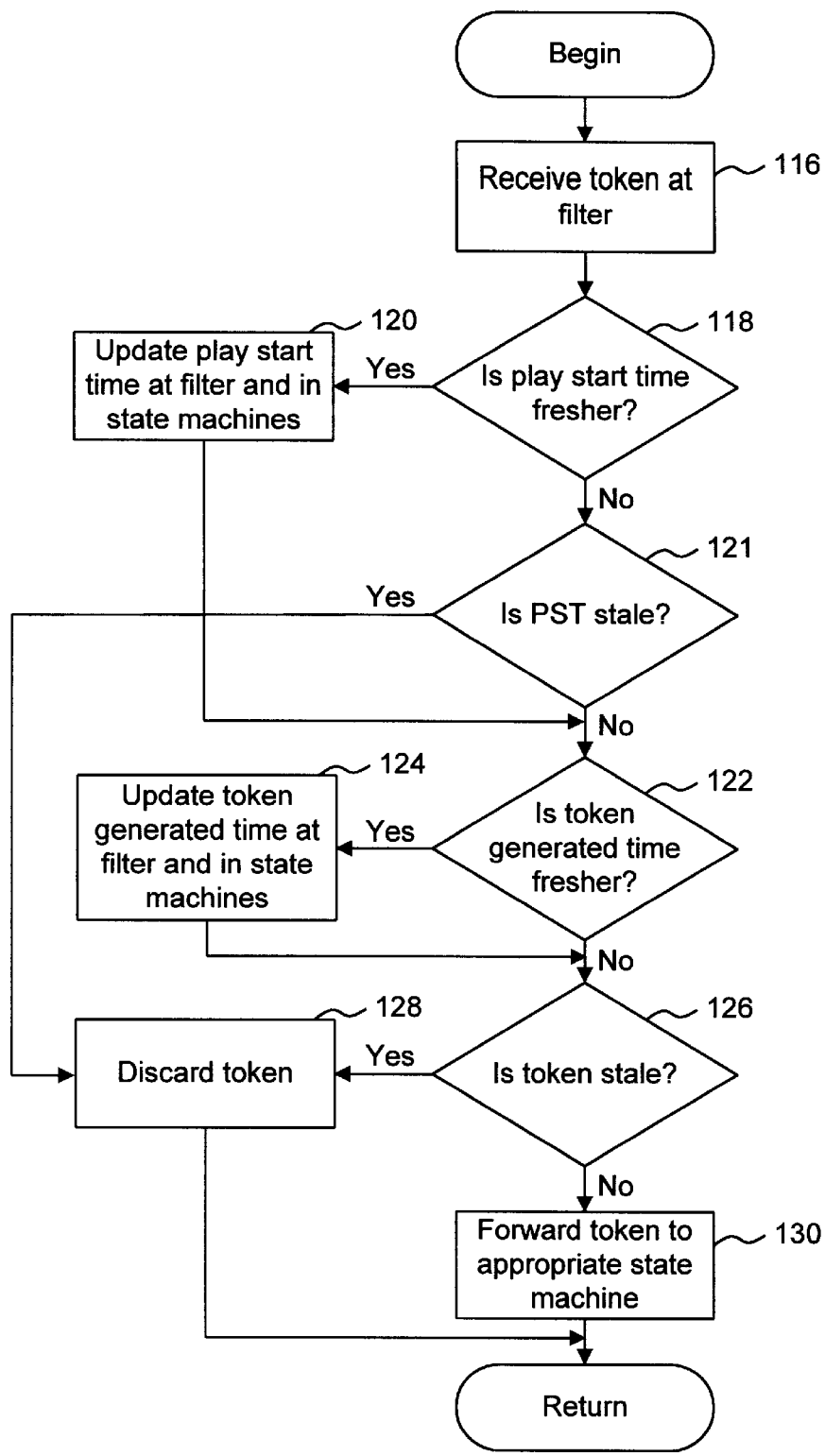
FIG. 8 is a flowchart illustrating the steps that are performed by the filter on tokens that are received by the token engine.

As mentioned above, the filter 76 is also used to filter tokens. FIG. 8 is a flowchart of the steps performed by the filter 76 to filter tokens. First, the token 90 is received by the filter 76 (step 116 in FIG. 8). If the data funnel is operating in scheduled mode, the token is likely received from another cub that has forwarded the token after completing the sending of a data block. If the data funnel is operating in nonscheduled mode, the token is likely received from a home node. The filter 76 then compares the play start time of the token held in field 38 with the play start time recorded at the filter to determine whether the play start time of the token is fresher than the play start time recorded at the filter (step 118 in FIG. 8). If the play start time of the token is fresher, the play start time recorded at the filter 76 is updated and the state machines 78 and 80 are informed of the updated play start time by triggering an UpdatePST event (step 120 in FIG. 8). If the play start time of the token is not fresher (in step 118), it is determined whether the play start time (PST) of the token is stale (step 121 in FIG. 8). The play start time of the token is stale if it is older than the play start time maintained at the filter. If the play start time of the token is stale, the token is discarded (step 128 in FIG. 8) and no further action is taken. Where the play start time of the token is not stale, the filter 76 determines whether the token generated time stored in field 40 of the token is fresher than a token generated time stored at the filter 76 (step 122 in FIG. 8). The filter 76 stores a most recent token generator time and uses these as a comparison value to be applied in step 122. If the token generated time of the token is fresher than the recorded token generated time stored at the filter 76, the value held at the filter is updated and the state machines 78 and 80 are informed of the updated token generated time by generating an UpdateTGT event (step 124 in FIG. 8).

The filter 76 next determines whether the token is stale (step 126 in FIG. 8). If the token is determined to be stale, the token is discarded (step 128 in FIG. 8). The steps performed to determine whether the token is stale in step 126 will be described in more detail below. If the token is determined not to be stale, it is forwarded to the appropriate state machine (step 130 in FIG. 8).

Figure 9:
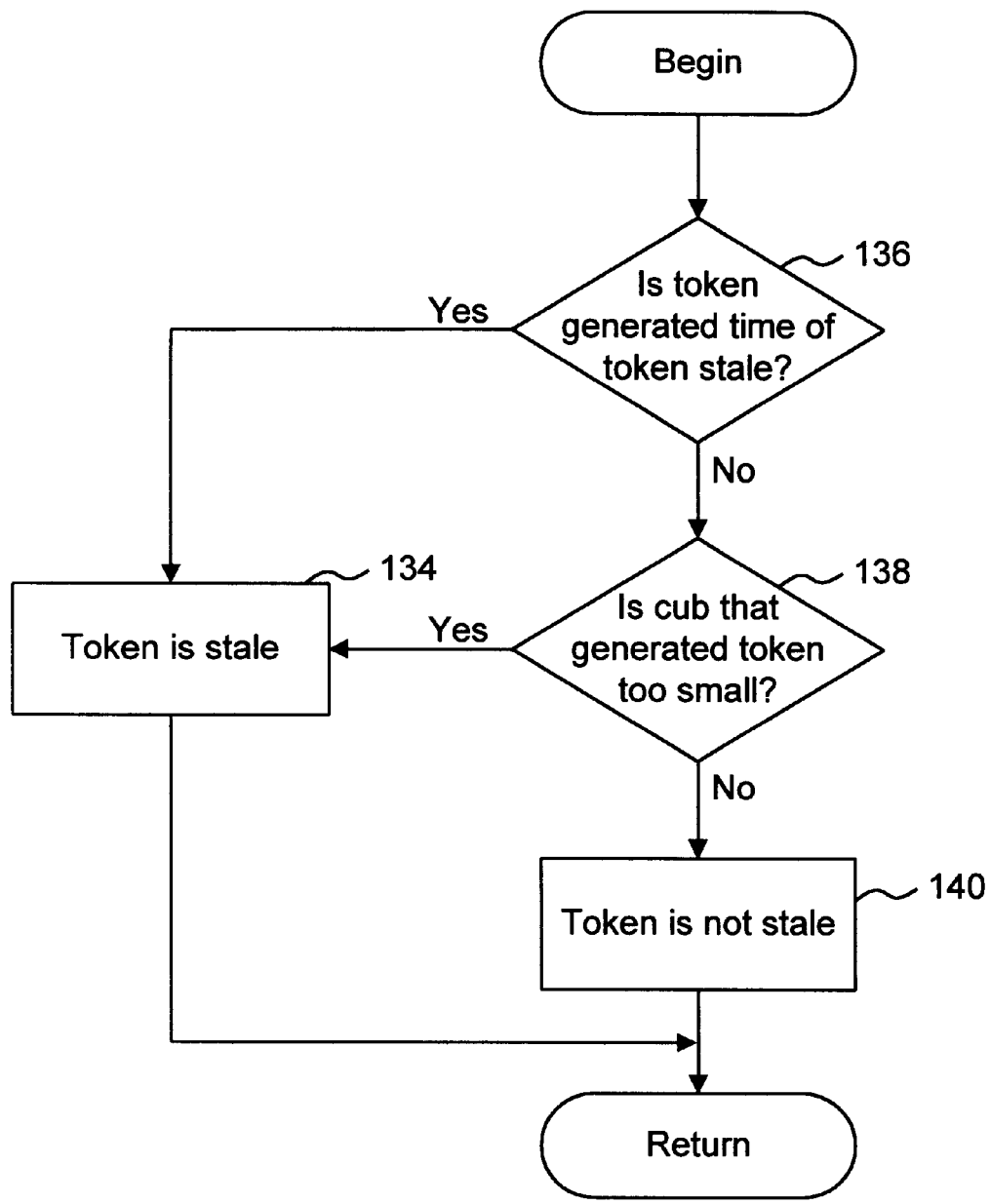
FIG. 9 is a flowchart illustrating the steps that are performed by the filter to determine whether a token is stale.

FIG. 9 is a flowchart illustrating the steps that are performed to determine whether or not a token is stale in step 126 in FIG. 8. First, the filter 76 determines whether the token generated time of the token is older than the token generated time recorded at the filter (step 136 in FIG. 9). If the token generated time is older, the token is determined to be stale (step 134 in FIG. 9). On the other hand, if the token generated time of the token is not older than the token generated time recorded at the filter 76, the filter determines whether the identification of the cub that created the token as specified by field 48 is smaller than the anticipated identification of the creating cub. The filter 76 records identification values for cubs that generate tokens. These identifications are assigned in an increasing fashion and help to disambiguate two versions of a token that are generated by two different cubs at the same time. Thus, if in step 138 it is determined that the cub that generated the token has too small of an identifier, the token is determined to be stale. Otherwise, the token is determined to not be stale (step 140 in FIG. 9).

Scheduled Mode

As mentioned above, data blocks of a data sequence may be transmitted to a client over a data funnel in scheduled mode. In such situations, each cub that has a block to transmit in the data sequence uses the scheduled state machine 82 of the standard state machines 78 to properly direct the block to the client. The scheduled state machine 82 of the standard state machine 78 includes a set of events that trigger transition between states and a set of actions that are taken as a result of the transitions. The events that drive the scheduled state machine 82 are as follows:

Events

ScheduledBlockSubmit; UpdateTGT;
1stScheduledBlockSubmit; BlockDueTimerExpiry;
ReceivedScheduledToken; TokenGenerateTimerExpiry; and
SendComplete; TokenStaleTimerExpiry.
UpdatePST;

The ScheduledBlockSubmit event indicates that a block has been submitted to the state machine. The 1stScheduledBlockSubmit event indicates that the first block of a play sequence has been submitted to the state machine. The ReceivedScheduledToken event indicates the reception of a token at the state machine. The SendComplete event indicates the completion of the sending of a block to the network. The UpdatePST event indicates that the play start time has been superseded. Similarly, the UpdateTGT event indicates that the token generated time has been superseded. The BlockDueTimerExpiry, TokenGenerateTimerExpiry and TokenStaleTimerExpiry events indicate the expiration of associated timers.

The states that the scheduled state machine 82 may assume during scheduled play are as follows:

States

WaitingForBlockAndToken;
WaitingForToken;
WaitingForBlock;
WaitingForSendComplete; and
BlockDiscardedWaitingForToken.

The WaitingForBlockAndToken state is the default state which indicates that the state machine is waiting for both a block and a token to arrive. The WaitingForToken state indicates that the state machine is waiting for a token and the WaitingForBlock state indicates that the state machine is waiting for a block. The WaitingForSendComplete state indicates that the state machine is waiting for the network to complete sending a block. Lastly, the BlockDiscardedWaitingForToken state indicates that the state machine is waiting to see whether a late arriving token will arrive after discarding a data block.

The actions that are performed during the transition between states are as follows:

Actions

Generate a new token;
Pass a block to the network for sending;
Pass a token to the network for forwarding;
Return a buffer;
Discard an existing token; and
Set/Cancel a timer.

State transitions for each of the state machines provided by the preferred embodiment of the present invention are depicted in tables that are set forth in the attached appendix. Each of the state tables has a row that is labeled with possible states and the columns are labeled with possible events. In the cell corresponding to the row and column combinations specify an action and possibly a new state. Cells that hold an "illegal" value mean that the given event can never occur in a state. A "no action" value in a cell indicate that the event causes neither an action nor a state change to occur but is not illegal.

Figure 10:
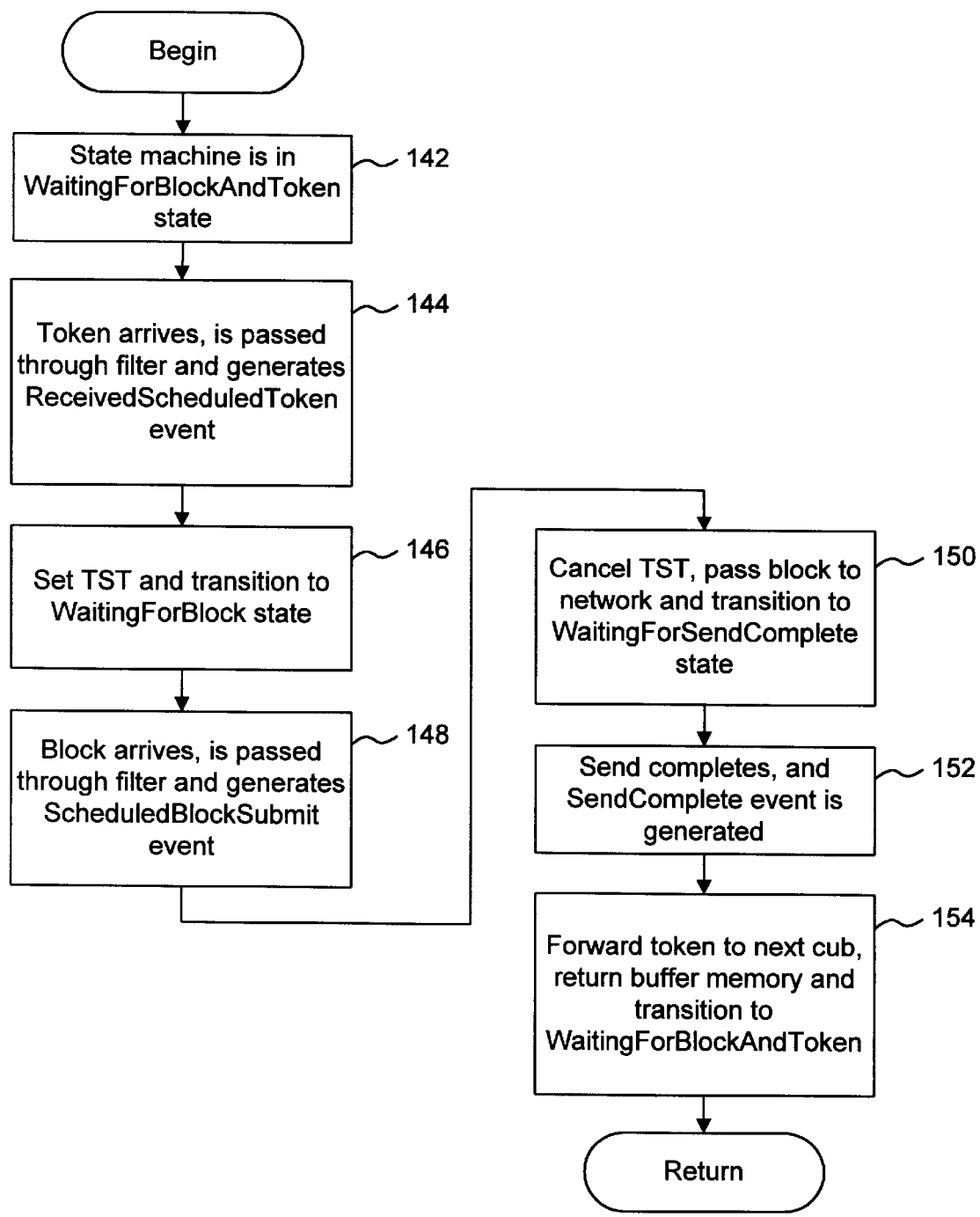
FIG. 10 is a flowchart illustrating the steps that are performed during normal operation in scheduled mode.

FIG. 10 is a flowchart illustrating the steps that are typically performed in the normal process of sending a scheduled block from a cub. Initially, the scheduled state machine 82 is in the WaitingForBlockAndToken state (step 142 in FIG. 10). Typically, a token arrives before the data block. The token is passed through the filter 76 and, assuming the token is not stale, a ReceivedScheduledToken event is generated (step 144 in FIG. 10). The generation of this event causes a token stale timer (TST) to be set and causes the scheduled state machine 82 to transition to the WaitingForBlock state (step 146 in FIG. 10). The TST is a timer that is set at a cub to indicate that the token is stale if a block does not arrive within a predetermined period of time. The predetermined period of time is the amount of time to which the TST is set. In the normal course of processing, the block arrives in a timely fashion before the TST expires, and the block is passed through the filter 76. Assuming that the block is not stale, it passes through the filter and a ScheduledBlockSubmit event is generated (see step 148 in FIG. 10). The TST is canceled due to the arrival of the block and the block 156 is passed to the network. The scheduled state machine 82 transitions to the WaitingForSendComplete state (step 150 in FIG. 10). The network 28A or 28B completes the sending of the block to the client and a SendComplete event (note completions 158 in FIG. 5) is generated (step 152 in FIG. 10). The token is then forwarded to the next cub that is to send a data block from the data sequence to the designated client. The buffer memory is returned and the scheduled state machine 82 transitions back to the WaitingForBlockAndToken state (step 154 in FIG. 10).

Figure 11:
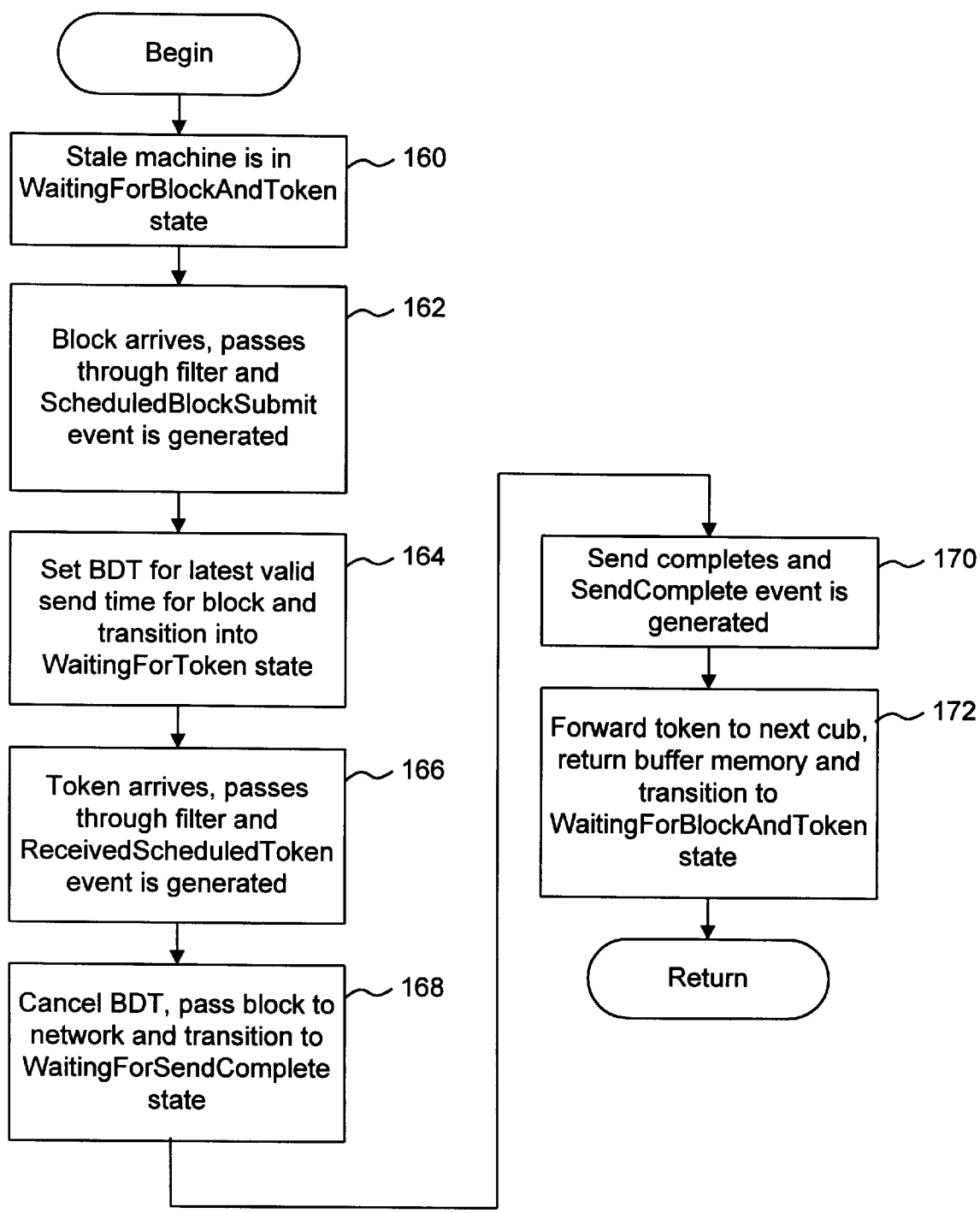
FIG. 11 is a flowchart illustrating the steps that are performed when a block precedes a token in scheduled mode.

As mentioned above, typically the token arrives before the block at the state machine 78. Nevertheless, there are instances wherein the block arrives before the token. FIG. 11 is a flowchart illustrating the steps that are performed in such an instance. Initially, the state machine 78 is in the WaitingForBlockAndToken state (step 160 in FIG. 11). The data block arrives and passes through the filter (assuming that the data block is not stale) and a ScheduledBlockSubmit event is generated (step 162 in FIG. 11). The generation of this event causes the block due timer (BDT) to be set for the latest possible valid send time for the block and the scheduled state machine 82 transitions into the WaitingForToken state (step 164 in FIG. 11). The BDT is a timer that is set to make certain that the block is sent after its due time. The BDT is set by the latest valid send time to give the system the maximum amount of time for the token to arrive before having to return the data block. The token subsequently arrives and passes through the filter 76. A ReceivedScheduledToken event is generated (step 166 in FIG. 11). The BDT is canceled because the token has arrived, and the block is passed to the network. The scheduled state machine 82 transitions to the WaitingForSendComplete state (step 168 in FIG. 11). The send completes and a SendComplete event is generated (step 170 in FIG. 11). The token (note 156 in FIG. 5) is then forwarded to the next cub that is due to send a data block of the data sequence, and buffer memory is returned. The scheduled state machine 82 transitions back to the WaitingForBlockAndToken state (step 172 in FIG. 11).

Figure 12:
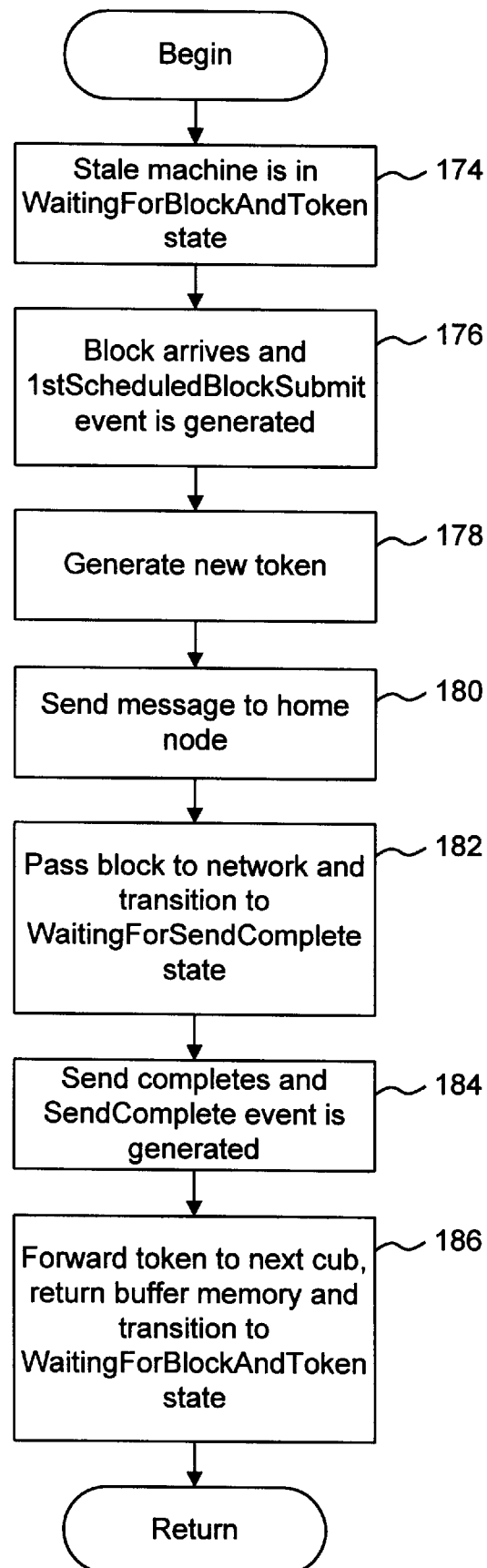
FIG. 12 is a flowchart illustrating the steps that are performed when the first block of a scheduled play arrives at the token engine.

At the beginning of a scheduled play, the steps that are performed will differ slightly from those described above. FIG. 12 is a flowchart that illustrates the steps that are performed in such an instance. The scheduled state machine 82 begins in the WaitingForBlockAndToken state (step 174 in FIG. 12). The first block of the scheduled play arrives and a I stScheduledBlockSubmit event is generated (step 176 in FIG. 12). The first block of new play flag 62 (FIG. 3) is set for the submitted block. A new token is generated in response to receiving the first block (step 178 in FIG. 12). The play start time field 38 is filled with the play start time value held in field 56 of the header 52 of the data block that has been submitted. The token generated time held in field 40 of the token is set to the current time. The scheduled state machine 82 sends a message to the designated home node to inform the home node of the updated play start time in order to stop any stale outstanding nonscheduled operations (step 180 in FIG. 12). Home nodes will be described in more detail below in the discussion of the nonscheduled mode of operation. The data block is then passed to the network and the scheduled state machine 82 transitions to the WaitingForSendComplete state (step 182 in FIG. 12). The send completes and a SendComplete event is generated (step 184 in FIG. 12). The token is then forwarded to the next cub, buffer memory is returned and the scheduled state machine 82 transitions to the WaitingForBlockAndToken state (step 186 in FIG. 12).

Figure 13:
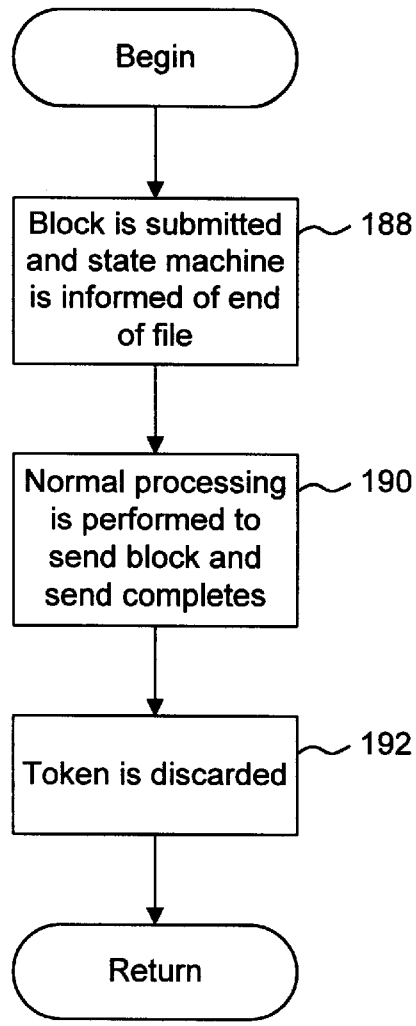
FIG. 13 is a flowchart illustrating the steps that are performed when end of file is reached in a scheduled play.

Eventually during the course of a scheduled play, an end of file is reached, indicating that all of the data of the data sequence has been output. FIG. 13 is a flowchart illustrating the steps that are performed in such an instance during scheduled play mode. Initially, the last block of the data sequence is submitted to the scheduled state machine 82, and the scheduled state machine is informed of the end of file (step 188 in FIG. 13). Assuming that the scheduled state machine has a token, normal processing occurs (see steps 150 and 152 in FIG. 10) to send the block over the network and the send completes (step 190 in FIG. 13). The token is then discarded (step 192 in FIG. 13). After the send completes, the scheduled state machine 82 returns to the WaitingForBlockAndToken state.

Figure 14:
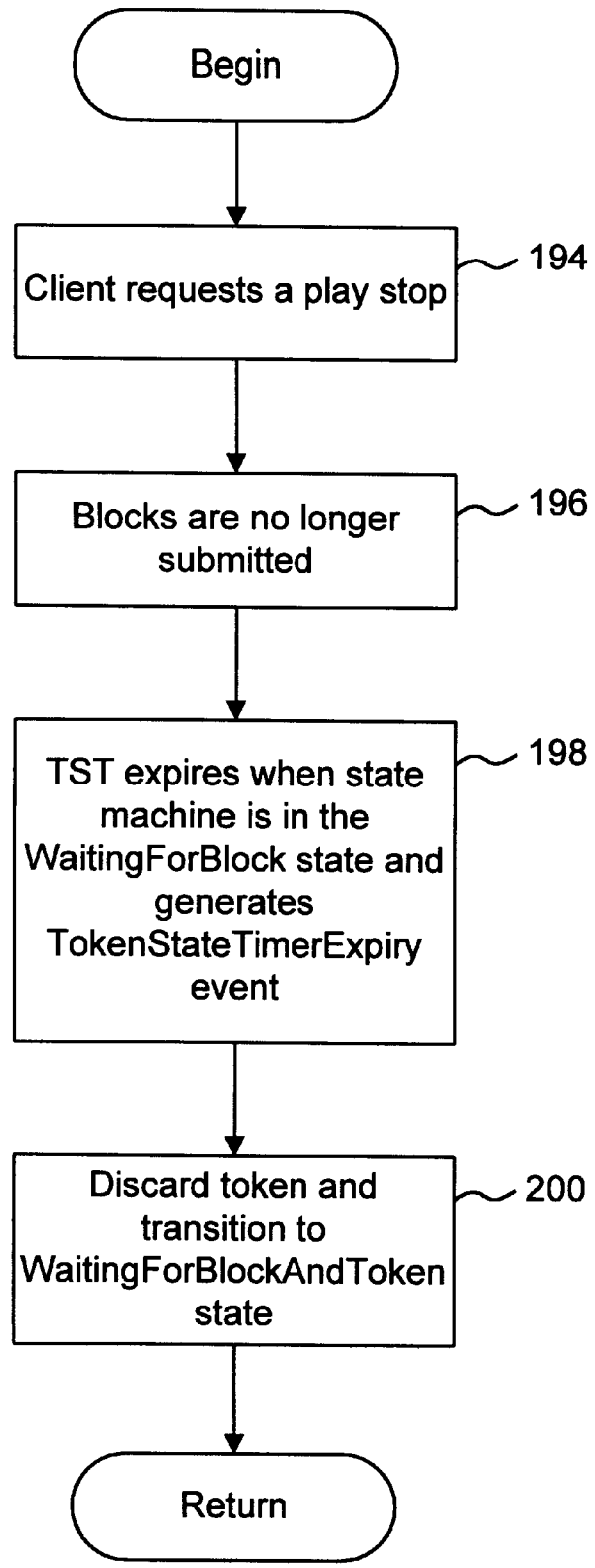
FIG. 14 is a flowchart illustrating the steps that are performed when a client requests the termination of a scheduled play.

A play sequence may also be stopped by explicit client (i.e., user) request. FIG. 14 is a flowchart illustrating the steps that are performed in such an instance. The client requests a play stop (step 194 in FIG. 14). In response, blocks are no longer submitted to the scheduled state machine 82 (step 196 in FIG. 14). Since the TST has been set and no block has arrived but a token has arrived (i.e., the state machine is in the WaitingForBlock state), the TST expires and a TokenStaleTimerExpiry event is generated (step 198 in FIG. 14). In response to this event, the token is discarded and the scheduled state machine 82 transitions to the WaitingForBlockAndToken state (step 200 in FIG. 14).

Figure 15:
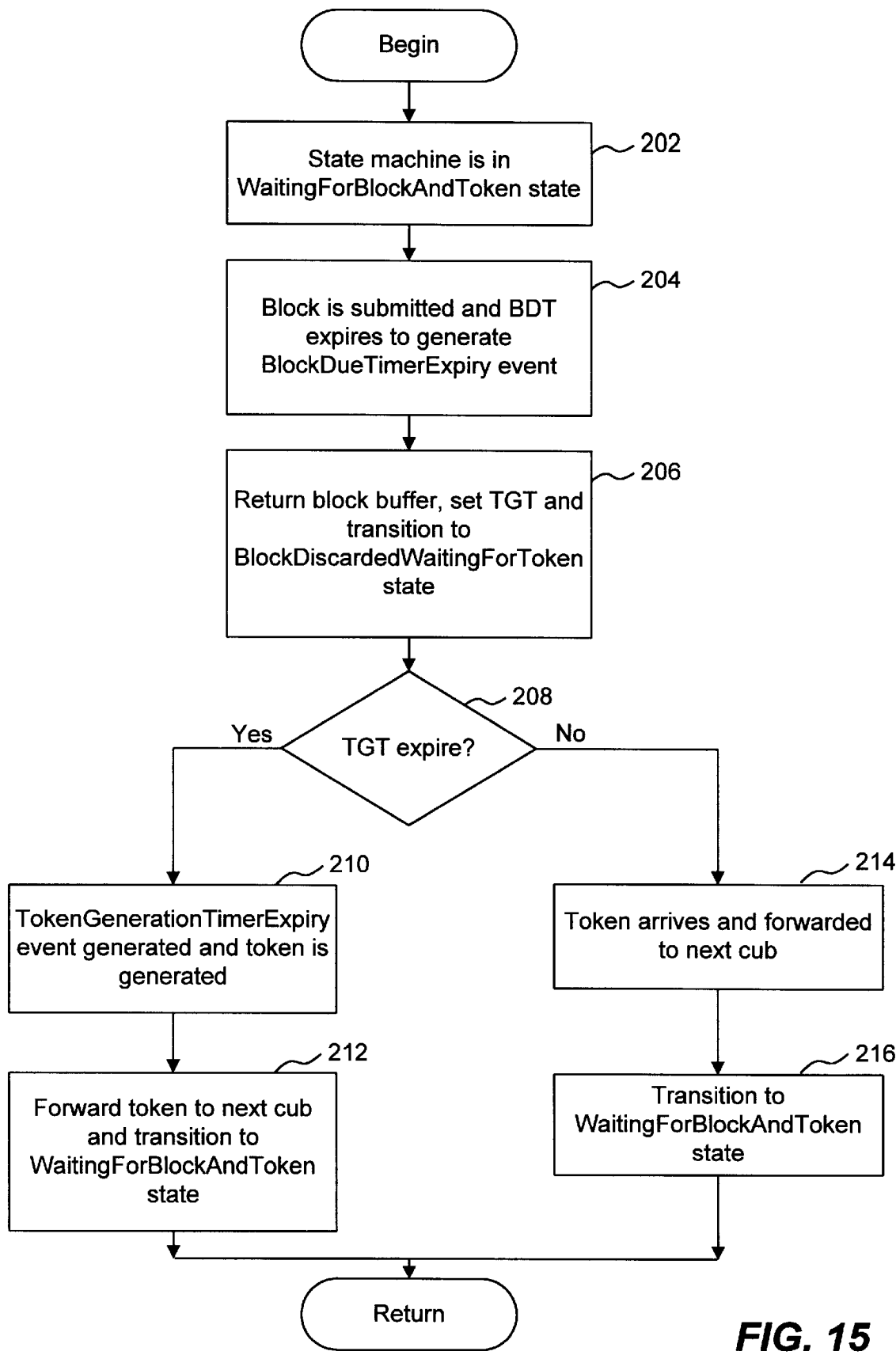
FIG. 15 is a flowchart illustrating the steps that are performed when a token fails to arrive in a timely fashion in scheduled mode.

A token for a scheduled play may not arrive as expected at the state machine 78 for a number of reasons. For example, the preceding cub may crash, the token may be lost or unduly delayed, or the preceding block may not be properly submitted. FIG. 15 is a flowchart illustrating the steps that are performed in such instances. Initially, the state machine is in the WaitingForBlockAndToken state (step 202 in FIG. 15). The data block is then submitted to the scheduled state machine 82 and the BDT expires due to the failure of the arrival of the token and causes a BlockDueTimeExpiry event to be generated (step 204 in FIG. 15). Since it is too late to send the block to the network, the block is returned to the source and the TGT is set to wait for the arrival of a token. The scheduled state machine 82 transitions to the BlockDiscardedWaitingForToken state (step 206 in FIG. 15). If the TGT expires (see step 208 in FIG. 15), a TokenGenerationTimerExpiry event is generated and a token is generated because a token has not been received in a timely fashion (step 210 in FIG. 15). The generated token is then forwarded to the next cub and the scheduled state machine 82 transitions back to the WaitingForBlockAndToken state (step 212 in FIG. 15). If, on the other hand, the TGT does not expire (see step 208 in FIG. 15), because the token arrives, the token is forwarded to the next cub that holds the next block of data to be output (step 214 in FIG. 15). The scheduled state machine 82 then transitions to the WaitingForBlockAndToken state (step 216 in FIG. 15). If the old token arrives later, the filter 76 will discard it because the old token has been made obsolete by the new token generated time recorded at the filter. The token generated timer (TGT) is usually set to a small value such as a hundred milliseconds.

It should be appreciated that the above-described approach permits the possibility of two cubs simultaneously sending to the same funnel because a new token is created when a valid token already exists. The protocol, however, minimizes this risk and the likelihood of such multiple sending is slim. An entire block play time must pass before a block may be sent using the new token. As such, it is unlikely that the previous send will have not completed before the new send begins. Moreover, it is unlikely that the stale token will be used to send another block because it will likely be discarded by the filter.

Figure 16:
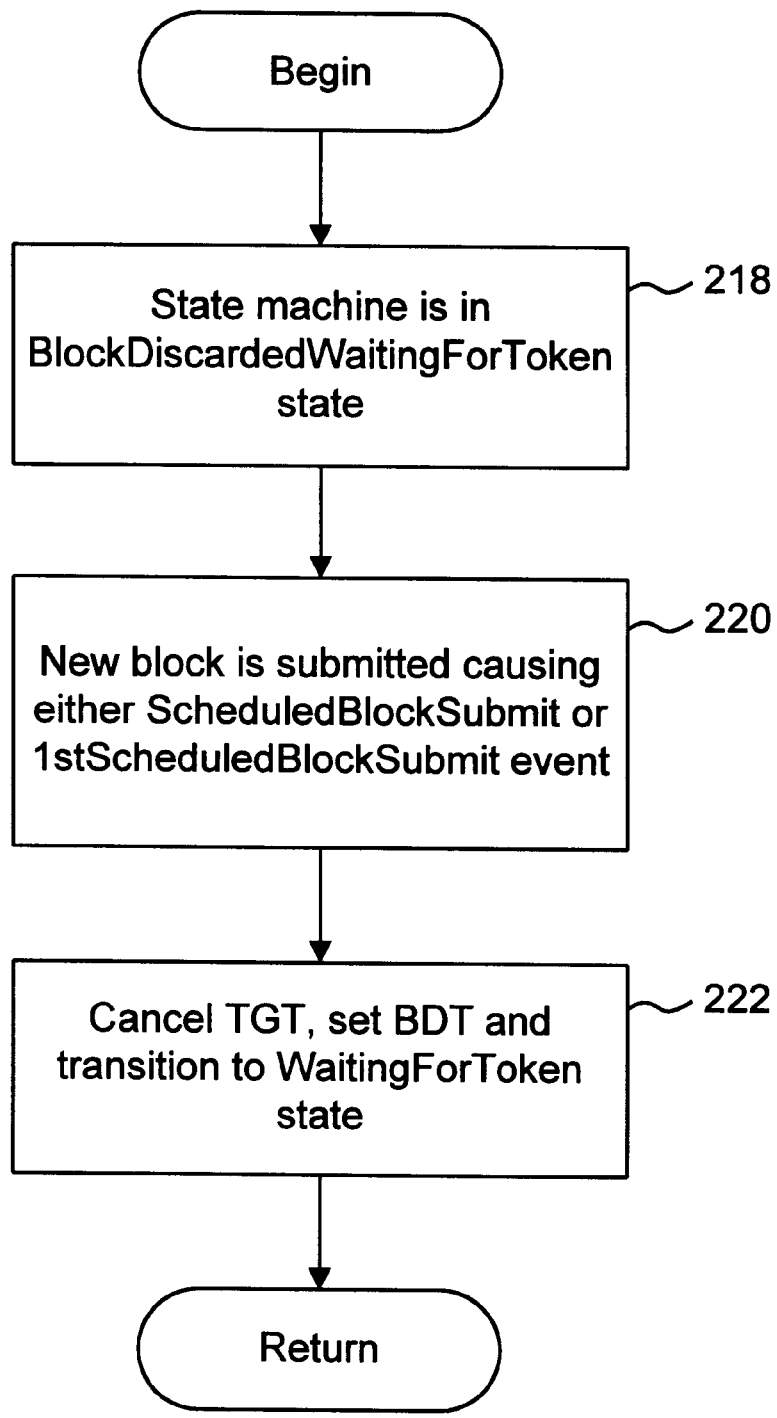
FIG. 16 is a flowchart illustrating the steps that are performed after a block has been discarded and a token has not yet been received in scheduled mode.

Another rare situation arises when a block is submitted and then no token arrives so that the block is discarded. Subsequently, another block is submitted before the TGT expires. In such a case, the steps shown in FIG. 16 are performed. The scheduled state machine 82 is in the Block- DiscardedWaitingForToken state (step 218 in FIG. 16). The new block is submitted, and depending upon whether it is the first block of a play sequence or not, a ScheduledBlockSubmit or 1stScheduledBlockSubmit event is generated (step 220 in FIG. 16). In response, the TGT is canceled because the block has arrived and the BDT is set to await a token. In addition, the scheduled state machine 82 transitions to the WaitingForToken state (step 222 in FIG. 16).

There may be instances in which the scheduled token arrives while the state machine is in the WaitingForSendComplete state. The arrival of the token implies that the send was initiated using a stale token. Unfortunately, it is not possible to stop the send in progress. The scheduled state machine 82 updates the token it holds so that it holds the newly arrived token and completes the existing or the outstanding send.

Figure 17A:
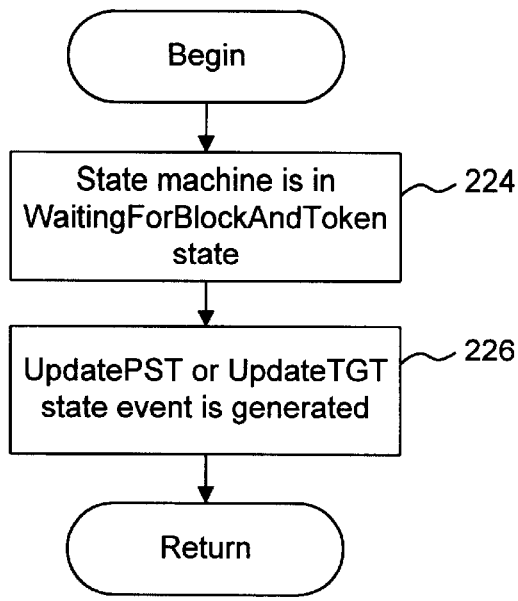
FIG. 17A is a flowchart illustrating the steps that are performed when an update timer event is generated and a standard state machine is in WaitingForBlockAndToken state.

The UpdatePST event and the UpdateTGT event were mentioned above. The effect of these events depends upon the state of the scheduled state machine 82. FIG. 17A is a flowchart that shows the steps that are performed when the state machine is in the WaitingForBlockAndToken state. The scheduled state machine begins in the WaitingForBlockAndToken state (see step 224 in FIG. 17A) and an UpdatePST or UpdateTGT state event generated (step 226 in FIG. 17A). This causes an UpdatePST event to be generated. No affirmative action is taken other than to update the respective values held.

Figure 17B:
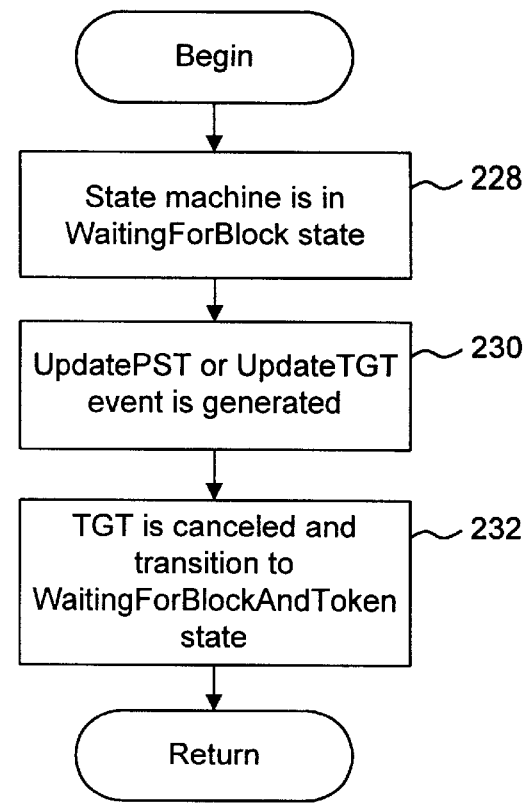
FIG. 17B is a flowchart illustrating the steps that are performed when an update timer event is generated and the standard state machine is in the WaitingForBlock state.

FIG. 17B illustrates the steps that are performed when one of these events is received and the scheduled state machine is in the WaitingForBlock state (see step 228 in FIG. 17B). An UpdatePST or UpdateTGT event is generated (step 230 in FIG. 17B) and in response, the TGT is canceled because the held token is stale and should be discarded. In addition, the scheduled state machine 82 transitions back to the WaitingForBlockAndToken state (step 232 in FIG. 17B).

Figure 17C:
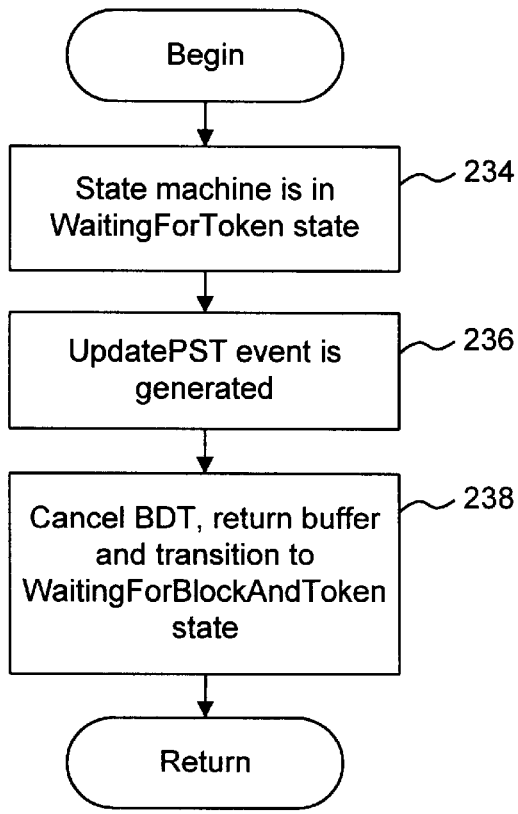
FIG. 17C is a flowchart illustrating the steps that are performed when an UpdatePST event is received while the standard state machine is in a WaitingForToken state.

FIG. 17C is a flowchart that illustrates the steps that are performed when the scheduled state machine 82 is in the WaitingForToken state (step 234 in FIG. 17C) and an UpdatePST even is generated (step 236 in FIG. 17C). In response, the BDT is canceled, the buffer is returned, and the scheduled state machine 82 transitions to the WaitingForBlockAndToken state (step 238 in FIG. 17C).

Figure 17D:
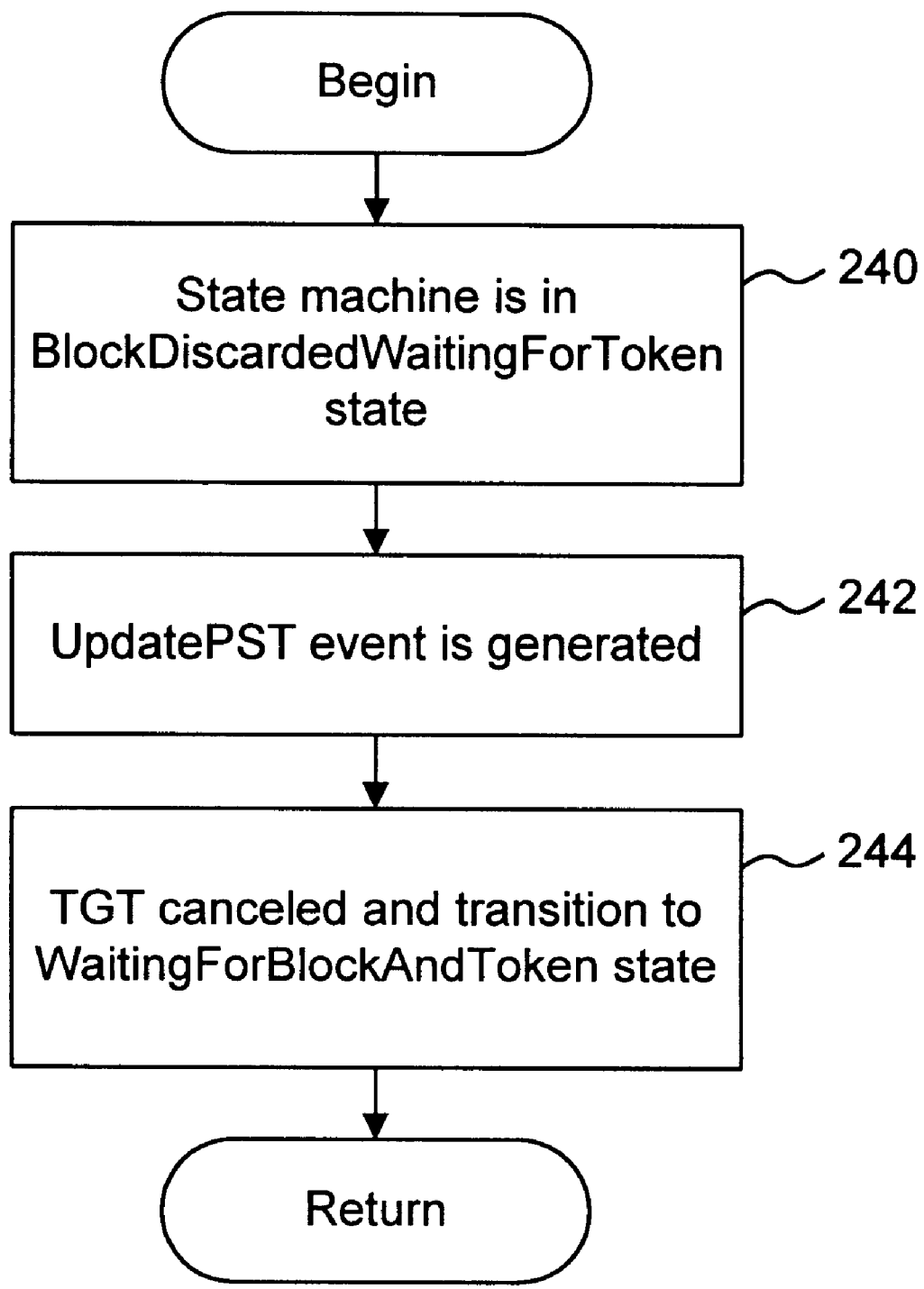
FIG. 17D is a flowchart illustrating the steps that are performed when an UpdatePST event is generated while the standard state machine is in a BlockDiscardedWaitingForToken state.

In any of the other states the UpdateTGT event invalidates any tokens that are held. The UpdatePST event, however, may cause different actions to occur. If the scheduled state machine 82 is in the BlockDiscardedWaitingForToken state (see step 240 in FIG. 17D) and an UpdatePST event is generated (step 242 in FIG. 17D), the TGT is canceled because a token that was awaited will never arrive and the state machine transitions to the WaitingForBlockAndToken state (step 244 in FIG. 17D).

The system 10 is capable of operating in a failed mode. The failed mode is implemented through a technique known as declustered mirroring that has a second copy of each data block stored on different cubs. The block is split up into a number of sub-blocks which are each stored on a different cub from where the block is stored. When a failed cub is scheduled to send data in scheduled mode, each of the mirroring cubs sends its pieces of the data in sequence to cause the block to be sent. Operation in failed mode is different in that the cub sequence changes and the block sizes becomes equal to the sub-blocks when the mirrored blocks are being transmitted. The block due time is set to a smaller value because of the smaller size of the sub-blocks. An example is helpful to illustrate operation in failed mode. Suppose that the system 10 includes six cubs and there are two sub-blocks per block. Further suppose that cub number 2 has failed. In the sequence cub 1 sends a normal full size block and specifies that the next cub is cub number 3. Cub number 3 holds the first half of the block that was to be transmitted by cub number 2. Hence, cub number 3 submits that the first half of the block (i.e., a sub-block) and specifies cub number 4 as the next cub. Cub number 4 holds the second sub-block and transmits a second half of the block to the next sender. Cub number 4 then specifies cub number 3 as the next sender. Cub number 3 sends its normal full size block or schedule.

Nonscheduled Mode

Figure 18:
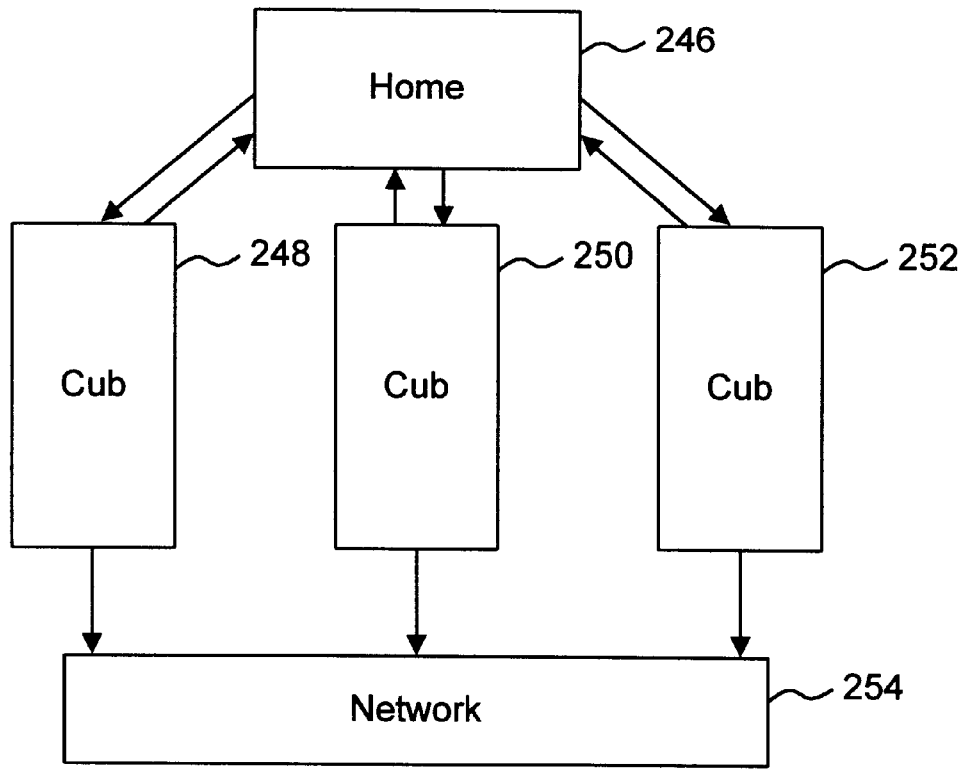
FIG. 18 is a block diagram illustrating data flow when a home node protocol of the preferred embodiment of the present invention is being executed.

The system 10 may also pass data over data funnels in a nonscheduled mode. In the nonscheduled mode, the operations are not predictable, and as such, the token engine cannot rely on the token being delivered automatically at or near the time that a block arrives. Accordingly, in nonscheduled mode, a home node protocol is followed. In particular, for each data funnel, a specified cub is determined to be the home node for that data funnel. Different nodes are used for different funnels so that the work associated with being a home node is being distributed among the cubs. In general, if a cub wishes to send a nonscheduled block of data, the cub requests that the token from the home node, waits until the token arrives and then sends the corresponding data block. FIG. 18 is a block diagram that helps to illustrate the basic operation of the home node protocol. FIG. 18 shows cubs 248, 250 and 252 that wish to send blocks of data in a nonscheduled mode. Each of the cubs request a token from the home node 246 and upon receiving the token send the data blocks over the network 254. The cubs 248, 250 and 252 then return the token to the home node 246 so that the home node may pass the token on to the next requesting cub. The home node protocol is executed largely by the home state machine 80 as is shown in FIG. 5, the home state machine 80 includes a queue 256 (FIG. 5) for enqueuing requests for tokens and the home state machine accepts and transmits tokens 258. The home node state machine 80 is running on a cub. The home node state machine 80 for different data funnels may run on a different cub.

1. Nonscheduled State Machine

The nonscheduled state machine 84 of the standard state machine 78 includes a number of states, events and actions, like the scheduled state machine 82. The permissible states for this component 84 of the standard state machine 78 are as follows:

States

WaitingForBlockAndToken;

WaitingForTokenFromHome;

WaitingForNonschedSendComplete; and

WaitingForNSSendCompleteHoldingToken.

The WaitingForBlockAndToken state is shared with the scheduled state machine 82. The WaitingForTokenFromHome state is entered when a cub has requested a token from the home node and has not yet received the token. The WaitingForNonSchedSendComplete state is entered when a nonscheduled send has been initiated but not yet completed. Lastly, the WaitingForNSSendCompleteHoldingToken state is entered when a nonscheduled send is pending and the cub receives a scheduled token.

The nonscheduled component of the standard state machine 78 has the following events:

Events

BlockDueTimerExpiry; NonScheduledBlockSubmit;

SendComplete; ReceivedNonSchedToken; and

UpdatePST; HomeChange.

UpdateTGT;

The BlockDueTimerExpiry, SendComplete, UpdatePST and UpdateTGT events are all like those generated in scheduled mode. The NonScheduledBlockSubmit event is generated when a nonscheduled data block is received by the standard state machine 78. The ReceivedNonSchedToken event indicates that a nonscheduled token has arrived. The HomeChange event is generated when the home node for the data funnel changes due to a cub failure or reattachment of a previously failed home node.

The actions that are taken are similar to the actions taken in scheduled mode except that tokens must be explicitly requested from the home node. The actions will be described in more detail below.

Figure 19:
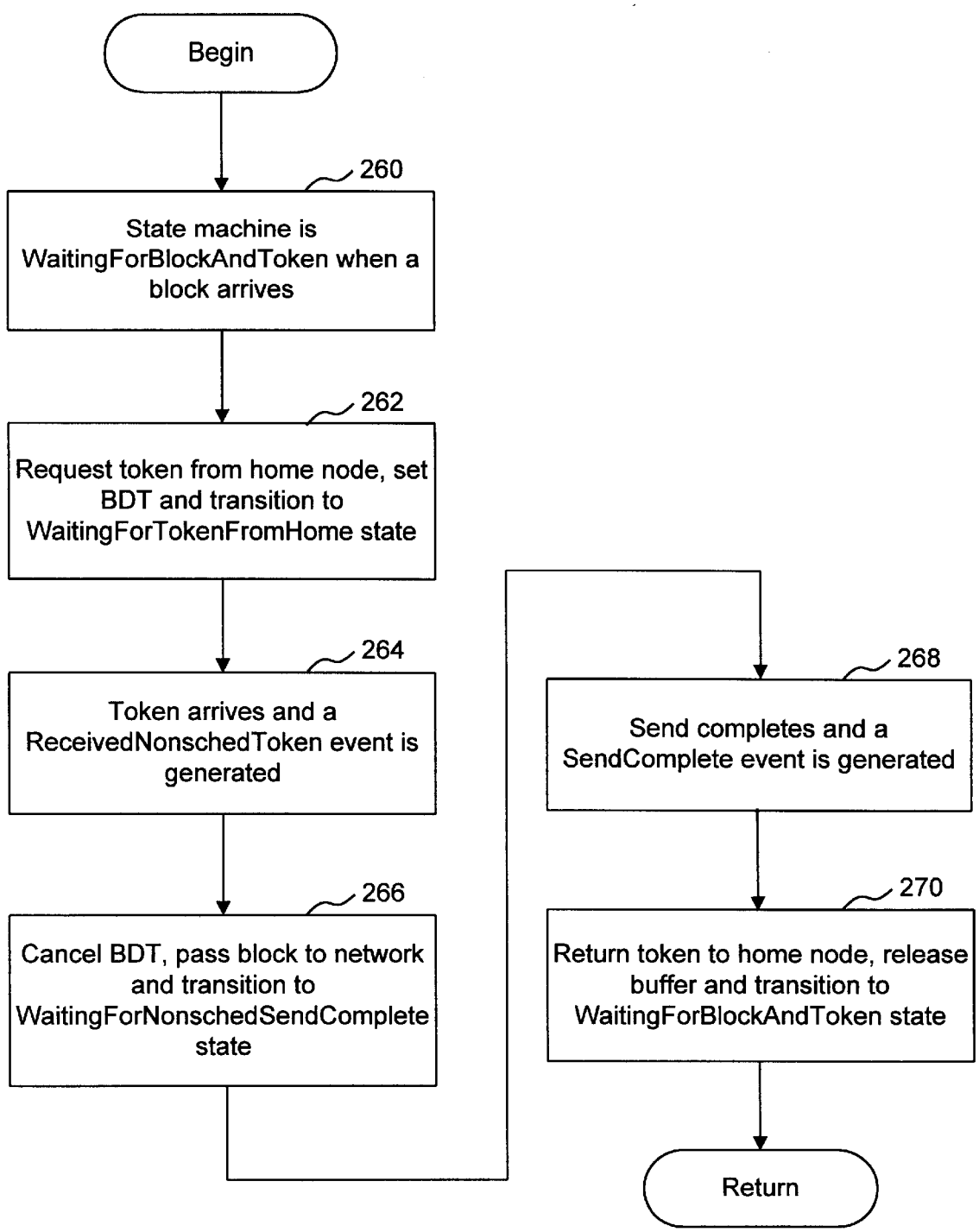
FIG. 19 is a flowchart illustrating the steps that are performed during normal operation of the standard state machine in nonscheduled mode.

FIG. 19 is a flowchart illustrating the steps that are performed during typical operation of the standard state machine 78 when the nonscheduled state machine 84 is active. Initially, the state machine is in the WaitingForBlockAndToken state and a block arrives (step 260 in FIG. 19). A request for a token from the home node is then made and the BDT is set to ensure that a token is received in a timely fashion. The state machine then transitions into the WaitingForTokenFromHome state (step 262 in FIG. 19). The home node receives the request and returns a token to the requested cub which results in the generation of a ReceivedNonSchedToken event (step 264 in FIG. 19). The generation of this event causes the cancelation of the BDT because the token has arrived and causes the data block to be passed to the network. The state machine then transitions to the WaitingForNonSchedSendComplete state (step 266 in FIG. 19). The send completes and a SendComplete event is generated (step 268 in FIG. 19). The token is returned to the home node, the buffer is released and the state machine transitions to the WaitingForBlockAndToken state (step 270 in FIG. 19).

Figure 20:
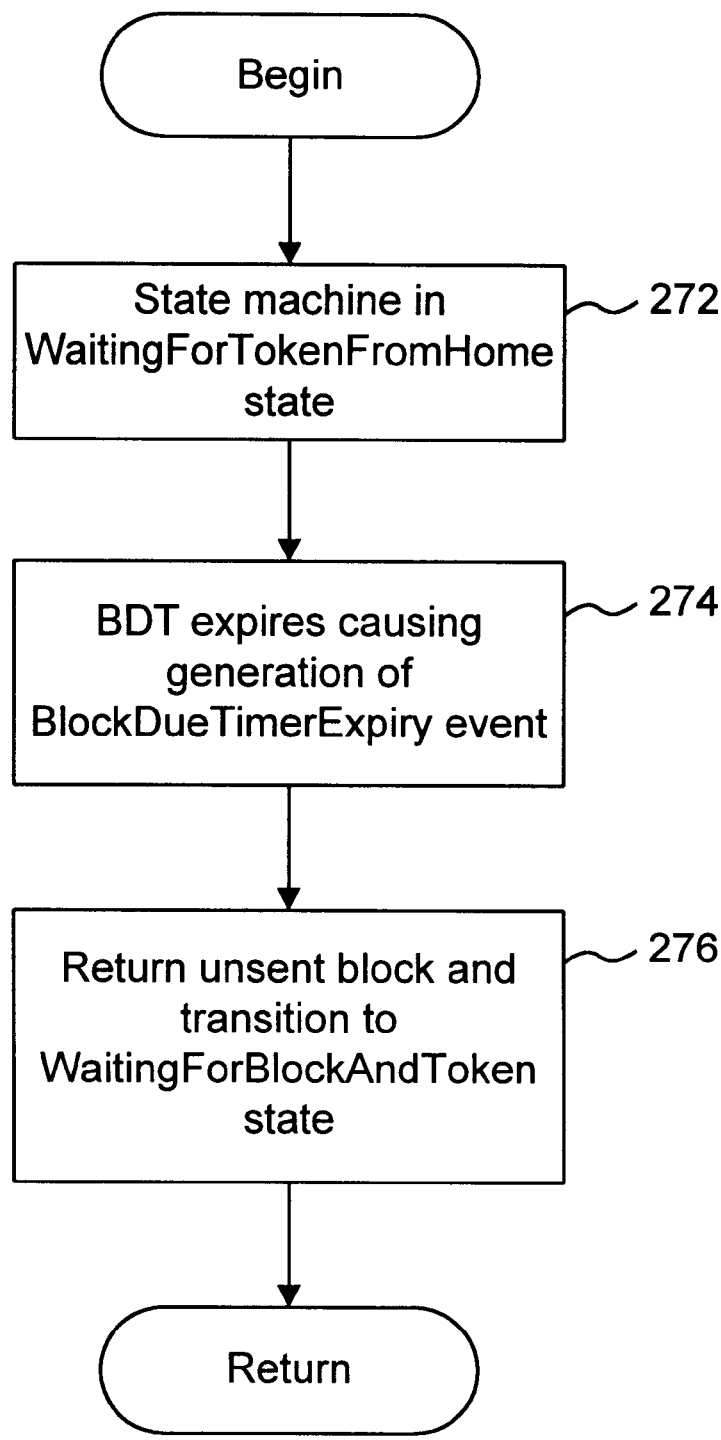
FIG. 20 is a flowchart illustrating the steps that are performed when a block due timer (BDT) expires in the nonscheduled mode of operation.

One complication that may arise while operating in nonscheduled mode is that a token may not arrive before the BDT expires. FIG. 20 is a flowchart illustrating the steps that are performed in such an instance. The state machine 78 is in the WaitingForTokenFromHome state (step 272 in FIG. 20). The BDT expires causing generation of a BlockDueTimerExpiry event (step 274 in FIG. 20). In response to this event, the unsent block is returned to its source and the state machine transitions back to the WaitingForBlockAndToken state (step 276 in FIG. 20).

Figure 21:
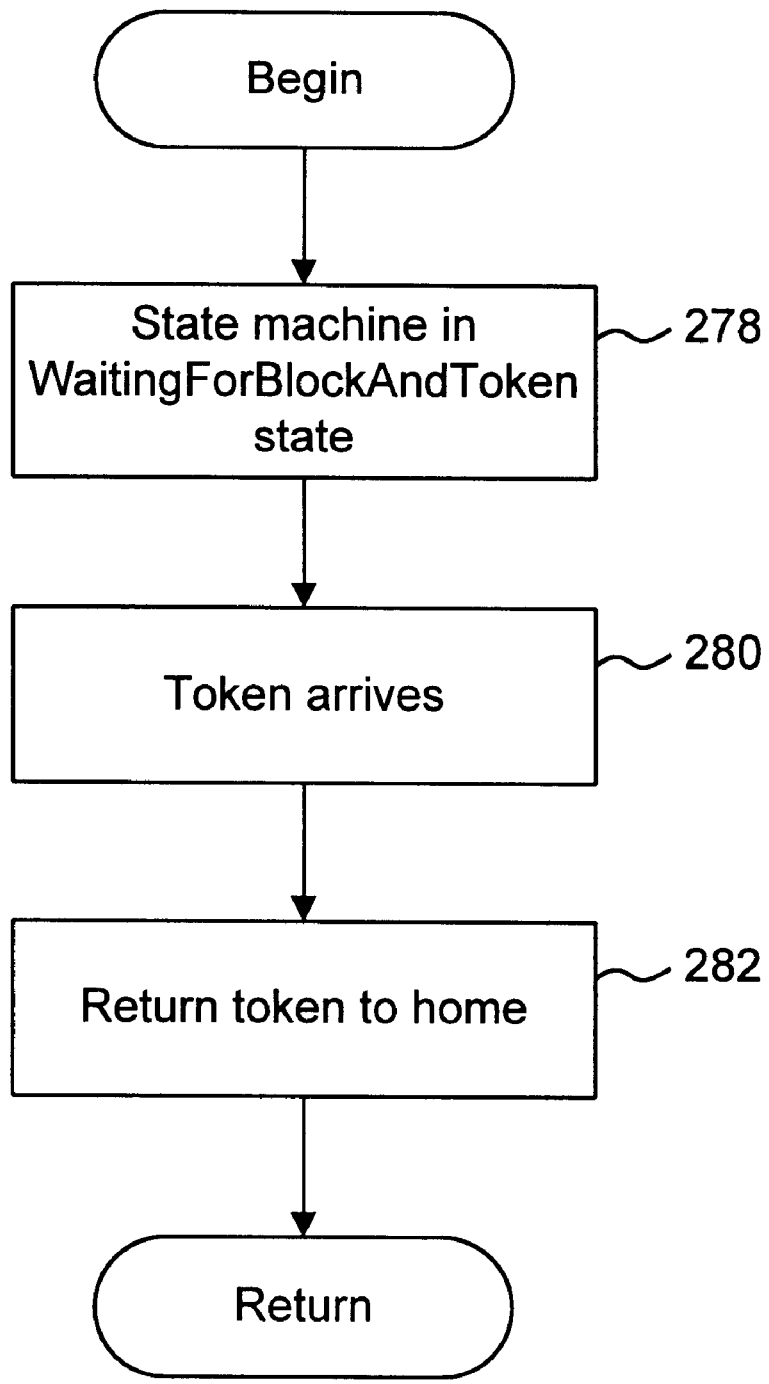
FIG. 21 is a flowchart illustrating the steps that are performed when a token is received at a cub and the standard state machine is in a WaitingForBlockAndToken state.

One possibility in the above-described situation is for a token arrive while the state machine 78 is in the WaitingForBlockAndToken state. FIG. 21 is a flowchart illustrating the steps that are performed in such an instance. The state machine is initially in the WaitingForBlockAndToken state (step 278 in FIG. 21) and a TokenArrives (step 280 in FIG. 21). The token is simply returned to the home node immediately (step 282 in FIG. 21).

Figure 22:
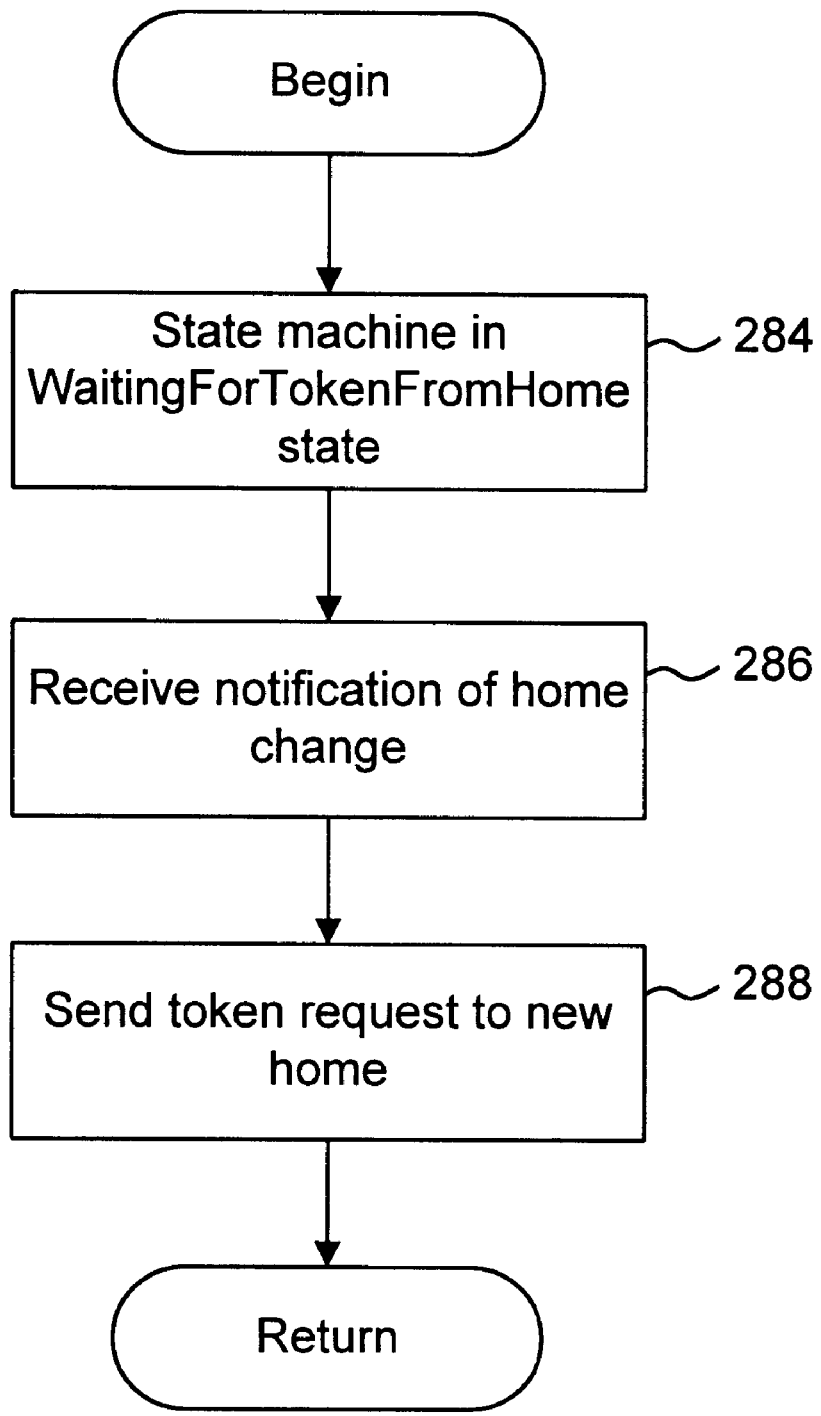
FIG. 22 is a flowchart illustrating the steps that are performed when a cub is awaiting a token from a home node and a home node change occurs.

The home node may change while operating in nonscheduled mode, in many instances because the machine running the home node state machine crashed or rejoined the system after crashing. FIG. 22 illustrates the steps that are performed in such a HomeChange when the state machine is in the WaitingForTokenFromHome state (step 284 in FIG. 22). The state machine receives notification of the HomeChange (step 286 in FIG. 22) and sends the token request that it had submitted to the old home node to the new home node (step 288 in FIG. 22). The resend of the request is necessary because the old home does not inform its backup or replacement of the token requests that are outstanding.

Figure 23:
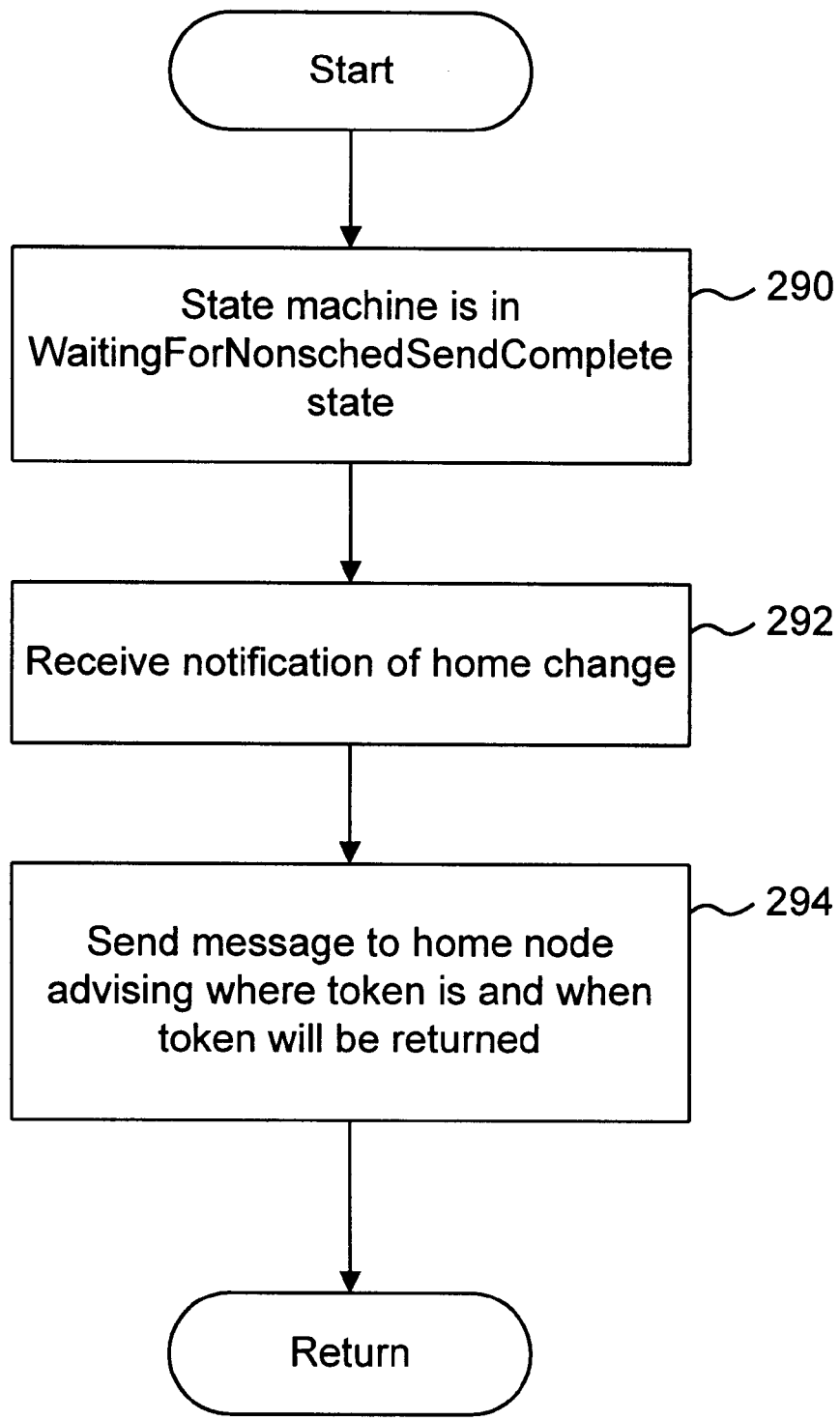
FIG. 23 is a flowchart illustrating the steps that are performed when a home node change occurs while a nonscheduled send is in progress.

Notification of the HomeChange may also occur while the nonscheduled state machine 84 is in the WaitingForNonSchedSendComplete state. FIG. 23 is a flowchart that illustrates the steps that are performed in such a situation. The nonscheduled state machine 84 is in the WaitingForNonSchedSendComplete state, indicating that a nonscheduled send is ongoing (step 290 in FIG. 23). The nonscheduled state machine 84 then receives notification of the HomeChange which causes the generation of the HomeChange event (step 292 in FIG. 23). The state machine then sends a message to the new home node to advise the new home node that it has the token and when it will return the token (step 294 in FIG. 23).

Figure 24A:
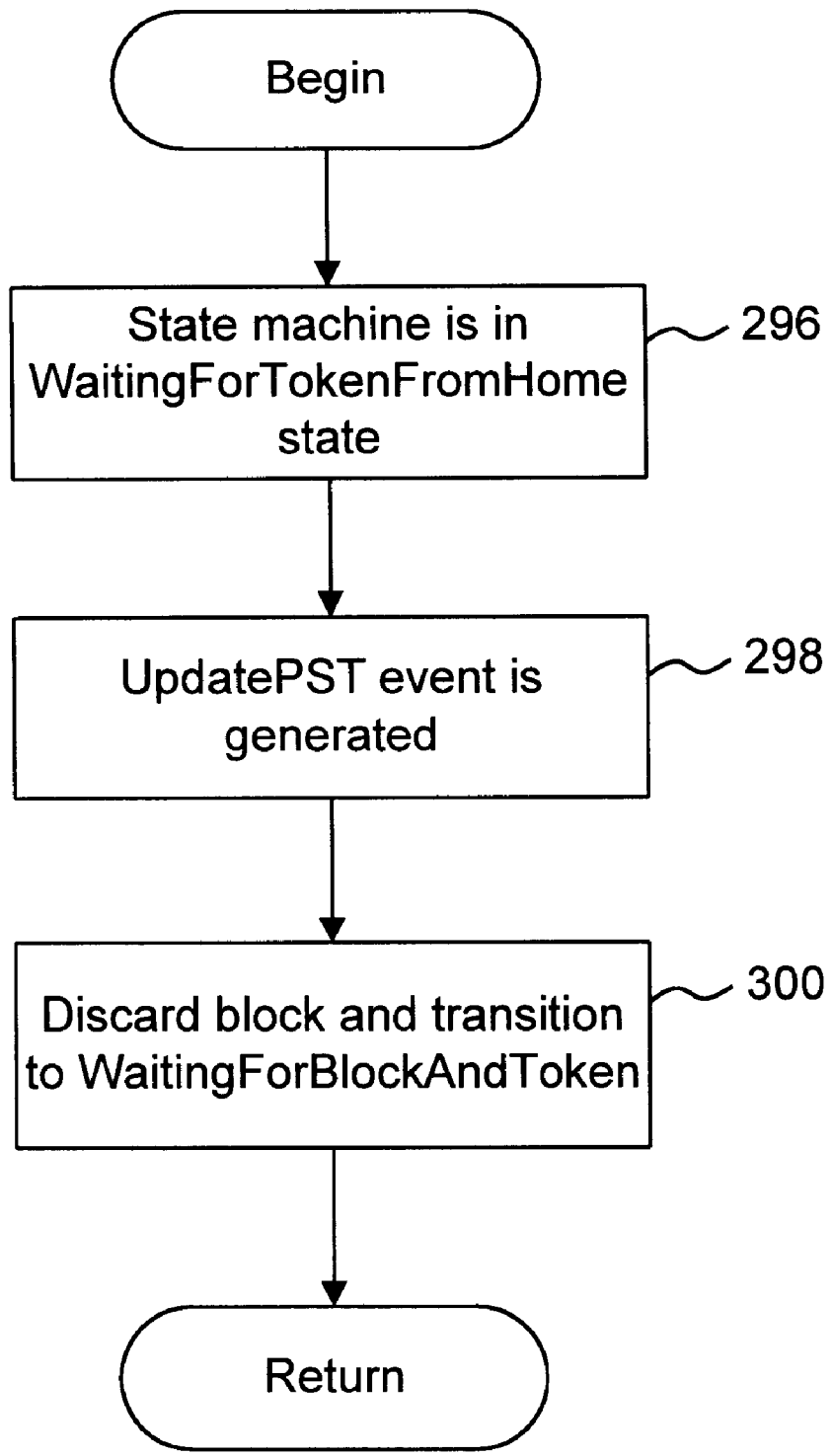
FIG. 24A is a flowchart illustrating the steps that are performed when an UpdatePST event is generated when the standard state machine is in a WaitingForTokenFromHome state.

The UpdatePST and UpdateTGT events cause actions to occur largely in the same way as actions occur in scheduled mode. However, since the scheduled mode does not have the WaitingForTokenFromHome state, the actions differ in nonscheduled mode when the state machine is in this state. FIG. 24A is a flowchart of the steps that are taken in such an instance. The state machine is in the WaitingForTokenFromHome state (step 296 of FIG. 24A) when an UpdatePST event is generated (step 298 in FIG. 24A). The block that is held at the nonscheduled state machine 84 is discarded, and the state machine transitions back to the WaitngForBlockAndToken state (step 300 in FIG. 24A).

Figure 24B:
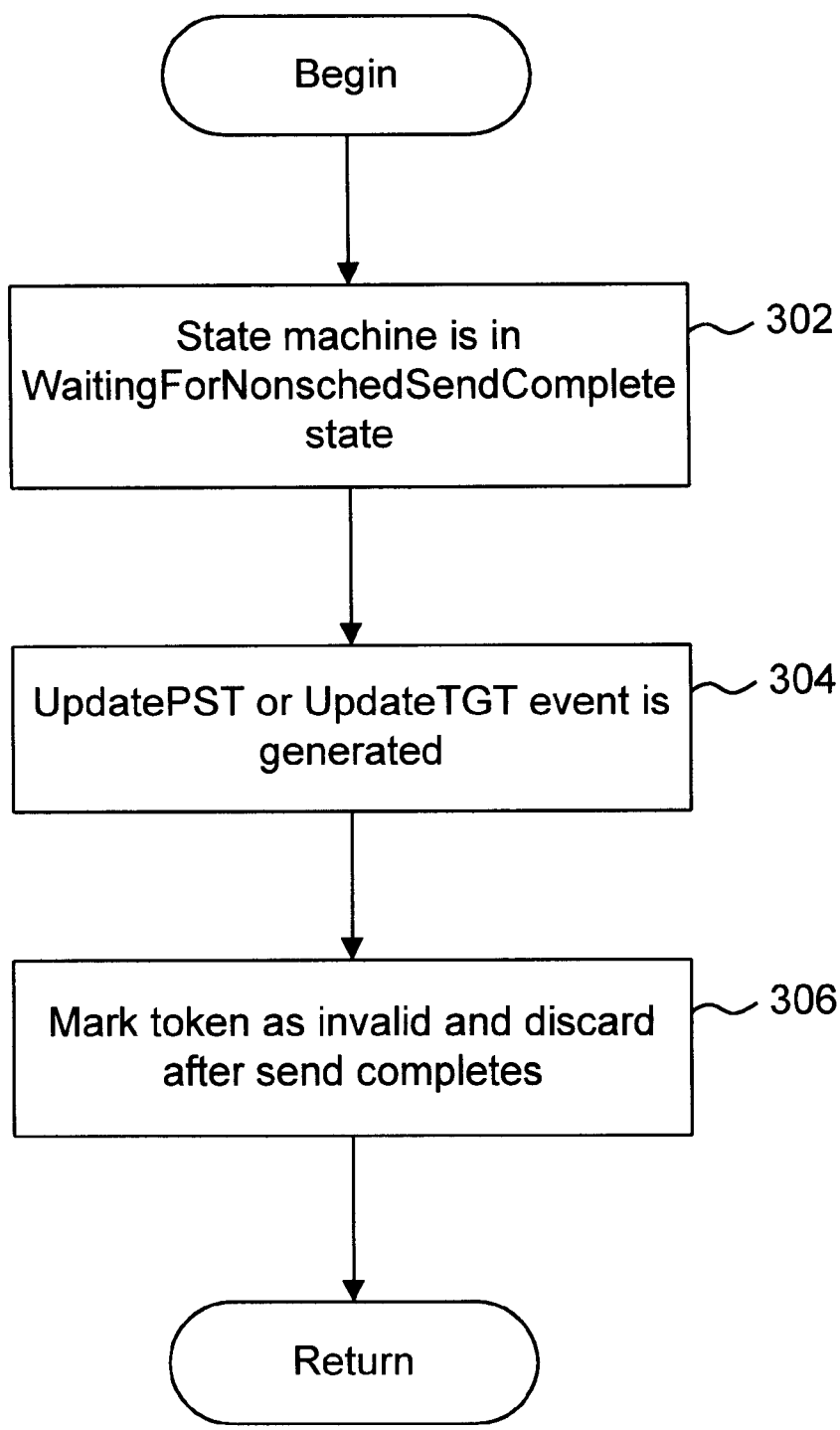
FIG. 24B is a flowchart illustrating the steps that are performed when an UpdateTimer event is generated while a nonscheduled send is in progress.

FIG. 24B shows that steps that are performed when an UpdatePST or an UpdateTGT event is generated (step 304) when the nonscheduled state machine 84 is in the WaitingForNonSchedSendComplete state (step 302). In particular, the token that the state machine is holding is marked as invalid and discarded after the send completes (step 306 in FIG. 24B).

2. Home Node State Machine

The above discussion has focused on the nonscheduled state machine 84 of the standard state machine 78. The home node, however, runs the home node state machine 80. The home node state machine has the following four states:

States

ScheduledMode;

WaitingToGenerate;

HomeWaitingForToken; and

HomeHoldingToken.

The ScheduledMode state arises when the home node state machine believes that the data funnel is being used for scheduled play. The WaitingToGenerate state is used during the transition from scheduled play to nonscheduled play and after a home change. The HomeWaitingForToken state occurs when the token is leased out to one of the cubs. Lastly, the HomeHoldingToken state occurs when the home node is waiting for a cub to request the token.

The home node state machine 80 supports the following events.

Events

HomeTokenRequest; HomeReceivedToken;

NonSchedTokenHeld; UpdatePST; and

TransitionTimerExpiry; UpdateTGT.

HomeTokenGenerationTimerExpiry;

The HomeTokenRequest event is generated when a cub requests a token. The NonSchedTokenHeld event is generated when a cub has sent a notification indicating that it holds the token. The TransitionTimerExpiry and HomeTokenGenerationTimerExpiry events are generated when the respective timers expire. The HomeReceivedToken event is generated when the home node receives a token. The UpdatePST and UpdateTGT events are generated when the play start time and token generated time need to be updated.

Figure 25:
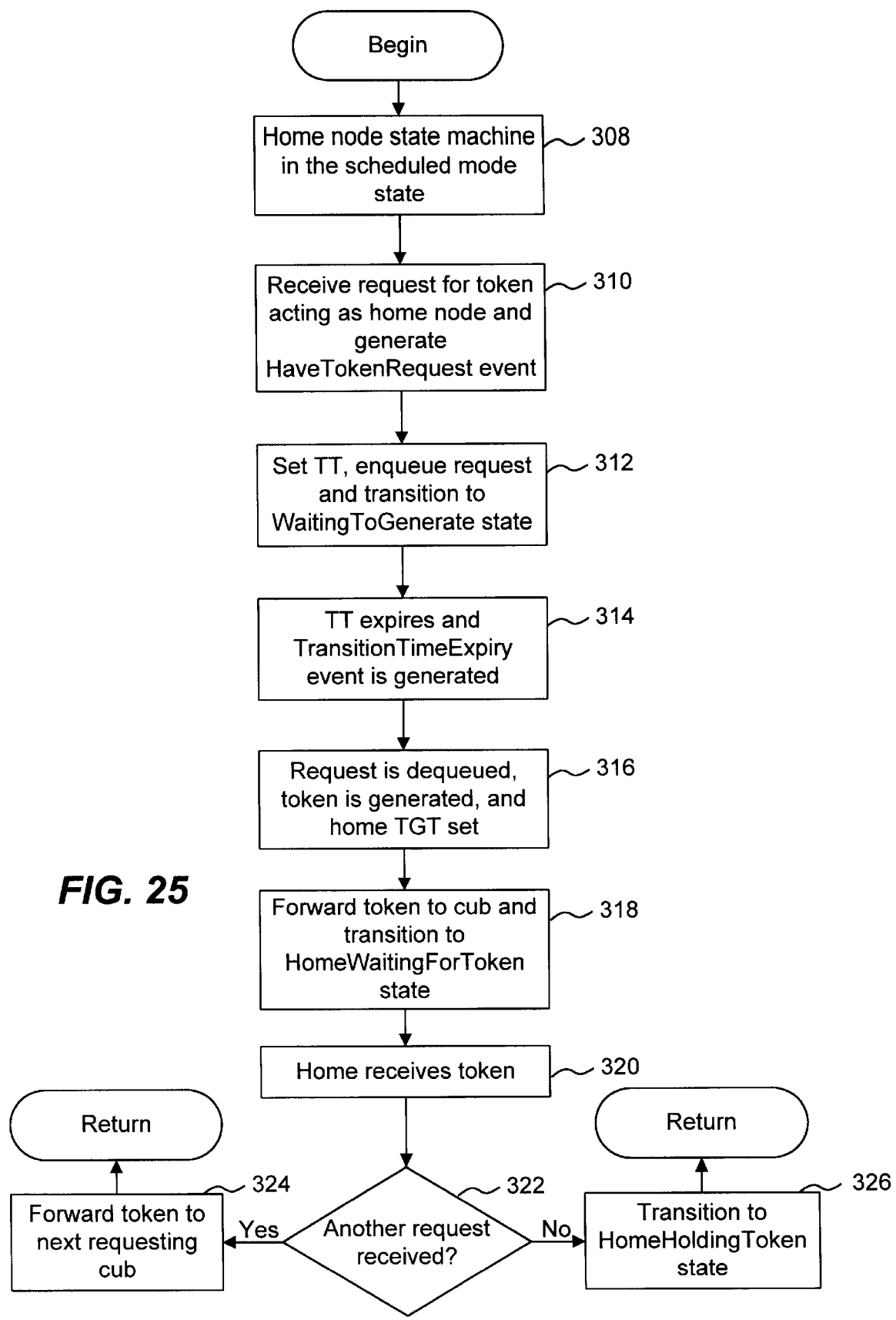
FIG. 25 is a flowchart illustrating the steps that are performed during normal operation of the home node state machine.

FIG. 25 is a flowchart illustrating normal operation of the home node state machine 80. Initially, the home node state machine is in the scheduled mode state (step 308 in FIG. 25). The home node receives a request for a nonscheduled token and this causes the generation of a HomeTokenRequest event (step 310 in FIG. 25). In response to this event, the home node state machine sets the TT, and queues the request in the queue 256 and transitions to the WaitingToGenerate state (step 312 in FIG. 25). In the normal case, the TT expires causing a TransitionTimerExpiry event to be generated (step 314 in FIG. 25). The TT provides sufficient time for any cubs to specify that they possess the token. The request for a token is then dequeued, the token is generated and the TGT for the home node is set (step 316 in FIG. 25). The token is forwarded to the cub that requested the token, and the home node state machine 80 transitions to the HomeWaitingForToken state (step 318 in FIG. 25). The home receives the token back from the cub after the cub has completed its nonscheduled play send (step 320 in FIG. 25). The home node state machine 80 then checks whether another request has been received and enqueued (step 322 in FIG. 25). If another request has been received, the token is forwarded to the requesting cub by dequeueing the request, forwarding the token and setting the home node TGT as described above (step 324 in FIG. 25). However, if no other requests are pending in step 322, the home node state machine 80 transitions to the HomeHoldingToken state (step 326 in FIG. 25).

Figure 26:
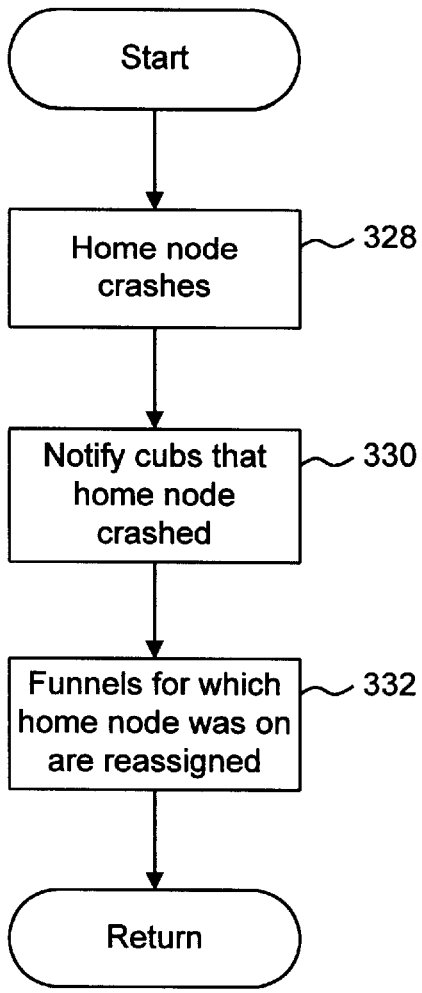
FIG. 26 is a flowchart illustrating the steps that are performed when a home node crashes.

It is possible that the home node may crash. FIG. 26 illustrates that the steps that are performed in such an instance. After the home node crashes (step 328 in FIG. 26), the cubs in the associated data funnel are notified that the home node has crashed (step 330 in FIG. 26). The data funnels for which the home node was acting in the home node capacity are reassigned (step 332 in FIG. 26).

Figure 27:
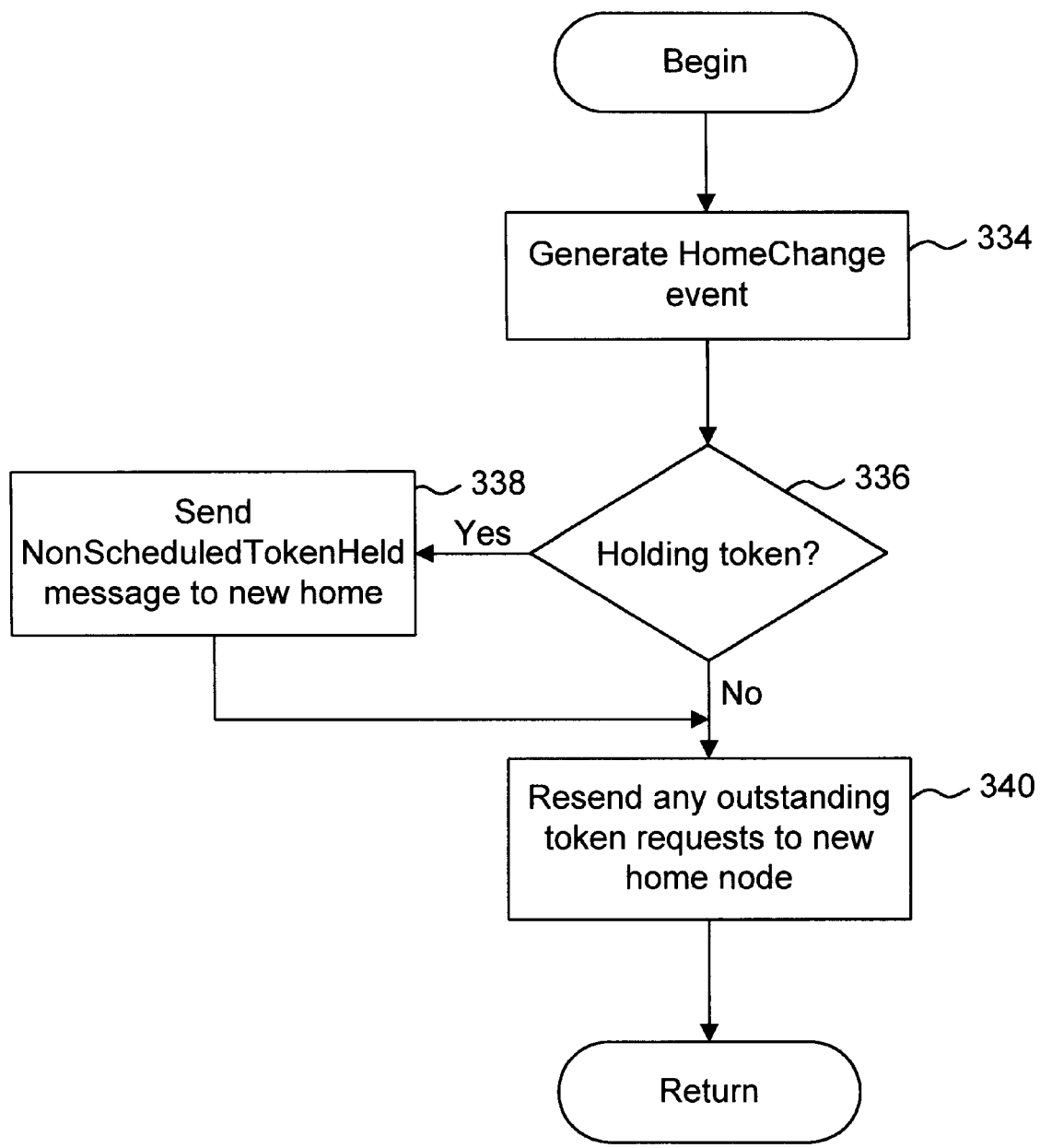
FIG. 27 is a flowchart illustrating the steps that are performed at a cub when a home node change occurs.

The reassignment of the home nodes for the data funnels results in home change events being generated in the nonscheduled state machines 84 on the affected cubs. FIG. 27 is a flowchart of the steps that are performed by the nonscheduled state machines 84 in such a situation. First, the home change event is generated at the nonscheduled state machine 78 (step 334 in FIG. 27). If the nonscheduled state machine 78 is holding the token (see step 336 in FIG. 27), a NonScheduledTokenHeld message is sent to the new home to generate a NonScheduledTokenHeld event there (step 338 in FIG. 27). Any outstanding token request by the cub are resent to the new home node (step 340 in FIG. 27).

FIG. 28A illustrates what happens when the home node crashes and the new home node is advised of the home change. Initially, the new home node is in the scheduled state (step 342 in FIG. 28A). The new home node receives the NonScheduledTokenHeld message from the cub that holds the token (step 344 in FIG. 28A). This causes a generation of a NonScheduledTokenHeld event and the new home node sets its TGT and the home node state machine 80 transitions into the HomeWaitingForToken state (step 346 in FIG. 28A).

In another scenario, the new home node is in the scheduled state (step 348 in FIG. 28B) and receives a HomeTokenRequest that triggers a HomeTokenRequest event before receiving a NonScheduledTokenHeld message (step 350 in FIG. 28B). In such a case, the home node does the normal transition from scheduled mode to nonscheduled mode as set forth in FIG. 25 (step 352 in FIG. 28B).

Figure 29:
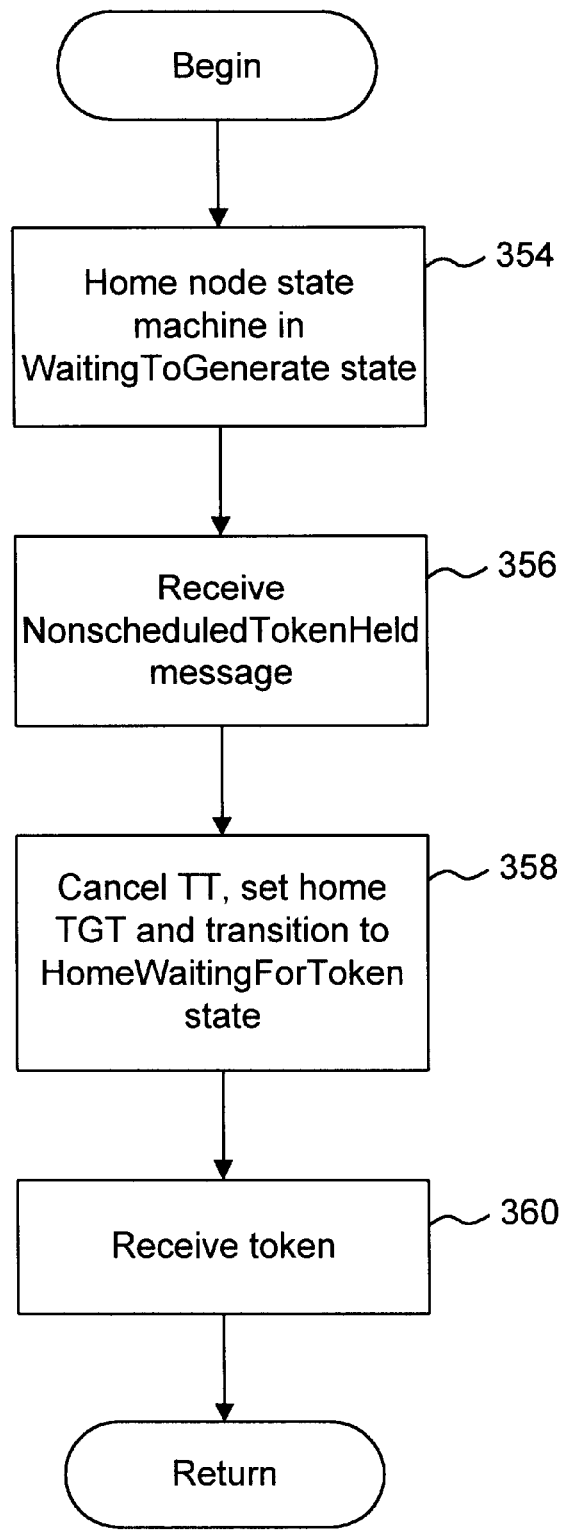
FIG. 29 is a flowchart illustrating the steps that are performed when a NonscheduledTokenHeld message is received by a home node that is in a WaitingToGenerate state.

Another possibility is that the home node state machine is in the WaitingToGenerate state when the switchover to the new home node occurs. FIG. 29 is a flowchart that illustrates the steps that are performed in such an instance. The new home node knows that it is the new home and is in the WaitingToGenerate state (step 354 in FIG. 29). Before the token is generated, a NonTokenScheduledHeld message is received by the new home node (step 356 in FIG. 29). The home node now knows that one of the cubs holds the token and will not generate a new token unless the old token is not forwarded to it in a timely fashion. Thus, the new home node cancels the TT, sets its home node TGT and the home node state machine 80 on the new home node transitions to the HomeWaitingForToken state (step 358 in FIG. 29). In normal instances, the new home node will receive the token (step 360 in FIG. 29). However, if the TGT expires, the new home node will generate a new token as has been described above.

As shown in FIG. 30, the home node state machine 80 for the new home node may be in the scheduled mode state (see step 362 in FIG. 30) when the token is received from the cub that was holding the token when the old home node crashed (step 364 in FIG. 30). The home node state machine 80 then transitions to the HomeHoldingToken state (step 366 in FIG. 30) and awaits requests for the token from the cubs of the data funnel (step 368 in FIG. 30).

FIG. 31 illustrates an instance when the home node state machine for the new home node is in the WaitingToGenerate state (see step 370 in FIG. 31) when the new home node receives a token (step 372 in FIG. 31). In such a situation, the token is used to service the next request that is enqueued. Thus, the TT is canceled, the next request is dequeued, and the home TGT is set (step 374 in FIG. 31). The token is forwarded to the requester and the home node state machine transitions to the HomeWaitingForToken state (step 376 in FIG. 31).

Figure 32:
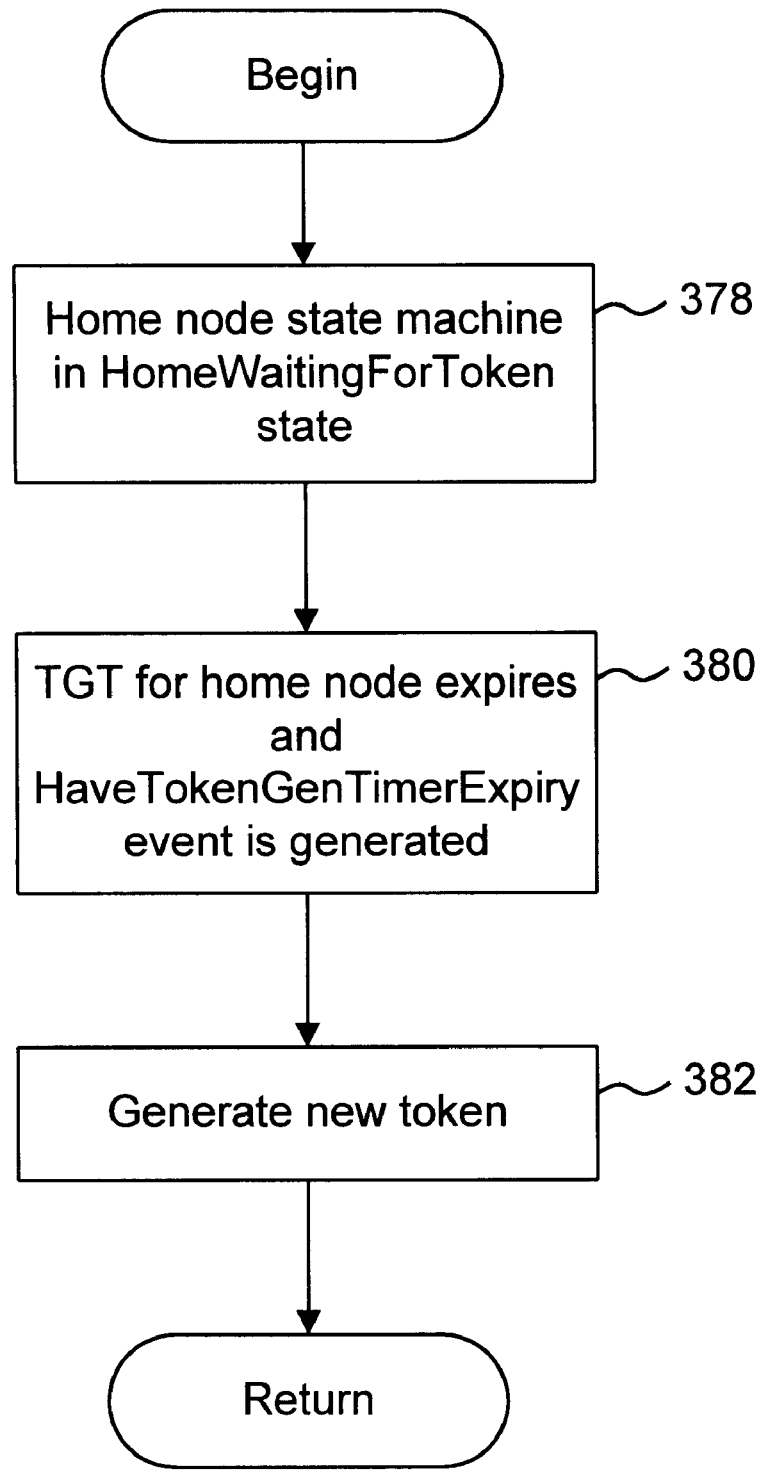
FIG. 32 is a flowchart illustrating the steps that are performed when a token generation timer (TGT) expires for a home node that is in the HomeWaitingForToken state.

Each cub that requests the token is granted the token only for a limited period of time known as the lease period. If the requesting cub does not return the token within the lease period plus an error allowance, the home node TGT will expire. FIG. 32 is a flowchart illustrating the steps that are performed at such an instance. Initially, the home node state machine 80 is in the HomeWaitingForToken state because it is waiting for the requested cub to return the token (step 378 in FIG. 32). Since the requested cub does not return the token, the TGT for the home node expires causing the HomeTokenGenTimerExpiry event to be generated (step 380 in FIG. 32). The home node then generates a new token (step 382 in FIG. 32).

Figure 33:
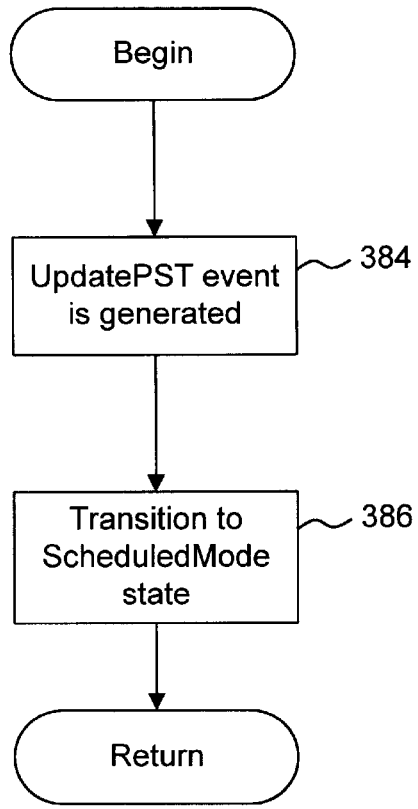
FIG. 33 is a flowchart illustrating the steps that are performed by a home node state machine when an UpdatePST event is generated.

UpdatePST and UpdateTGT events may be generated at the home node state machine 80. A change in the PST likely indicates that data funnel has shifted into scheduled mode. FIG. 3 shows the steps that are performed in such an instance. Initially, the UpdatePST event is generated (step 384 in FIG. 33). Since it is likely that the data funnel has shifted into schedule mode, the state machine transitions into the ScheduledMode state (step 386 in FIG. 33). If new requests subsequently arrive with a matching PST, the state machine will follow the normal course for transitioning from scheduled mode to nonscheduled mode.

Figure 34:
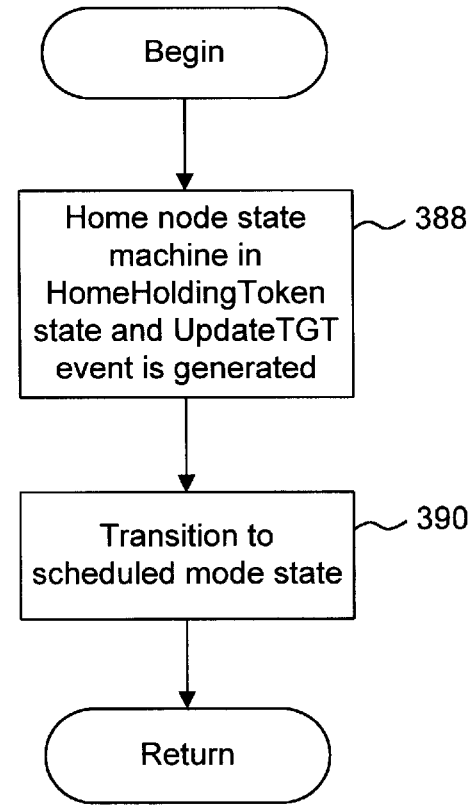
FIG. 34 is a flowchart illustrating the steps that are performed when an UpdateTGT event is generated while a home node state machine is in a HomeHoldingToken state.

The UpdateTGT event usually is generated when a requesting cub times out on returning the token and thus no action results. There may be instances, however, where action is needed. FIG. 34 is a flowchart that illustrates the steps performed to one such instance. If the home node state machine is in the HomeHoldingToken state and an UpdateTGT event is generated (step 388 in FIG. 34), it is clear that some other node has become the home node and the state machine transitions into the scheduled mode state (step 390 in FIG. 34).

Other States and Transitions

There are a number of transitions and one state for the standard state machine 78 that have not been discussed above. This state and the transitions occur when switching between scheduled mode and nonscheduled mode. The additional state is the WaitingForNSSendCompleteHoldingToken state. This state indicates that a valid primary token was received while a stale nonscheduled send was in progress. Since the send cannot be immediately stopped, the state machine must wait for the send to complete. Nevertheless, the state machine must remember that a valid scheduled token has arrived and that it is likely to get a scheduled block as soon as the nonscheduled send completes.

Figure 35:
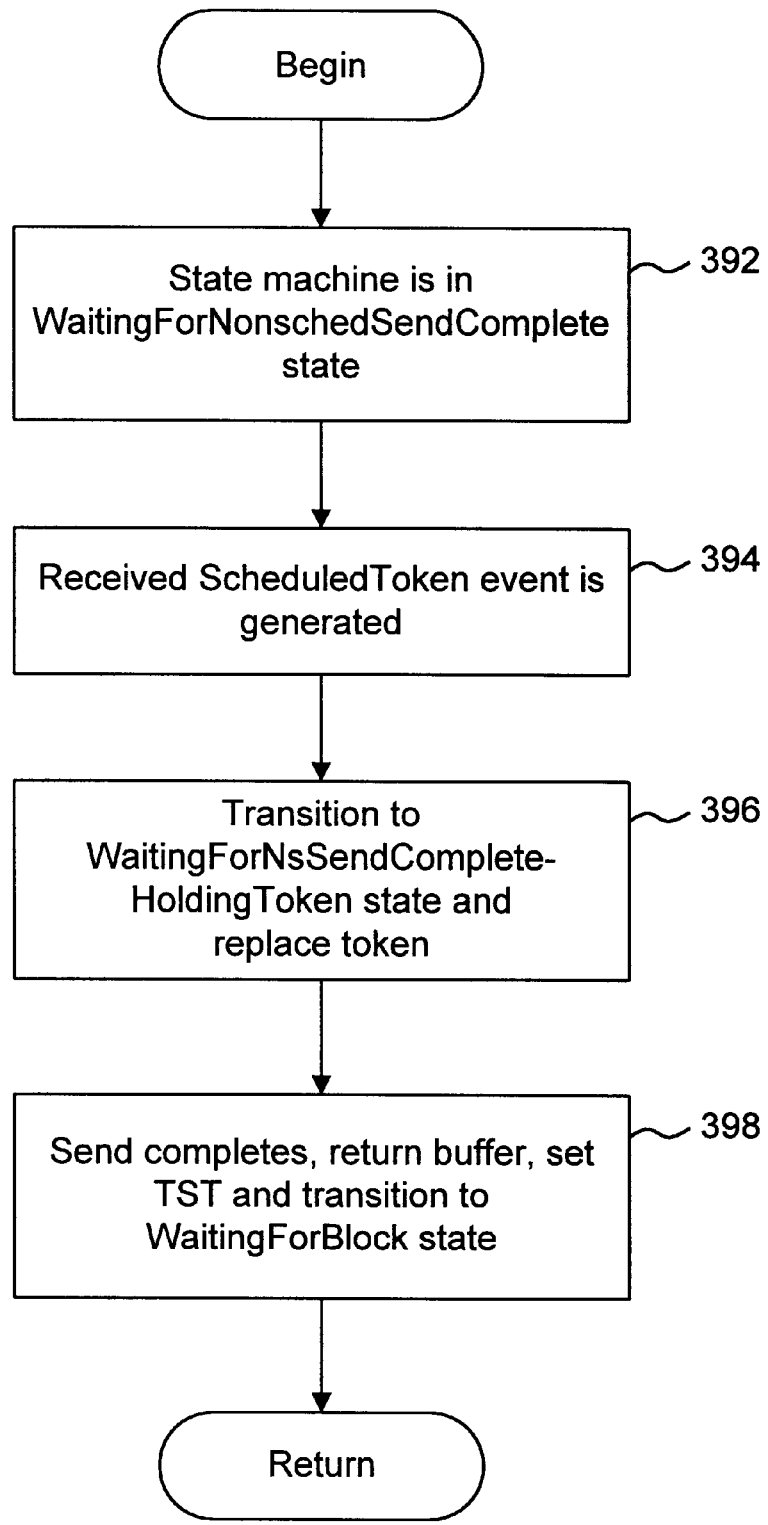
FIG. 35 is a flowchart illustrating the steps that are performed when a scheduled token is received while the standard state machine is in a WaitingForNonschedSendComplete state.

FIG. 35 is a flowchart illustrating the steps that are performed when a scheduled token is received while in the WaitingForNonschedSendComplete state. Initially, the standard state machine 78 is in the WaitingForNonschedSendComplete state (step 392 in FIG. 35). The scheduled token is received and causes the generation of a ReceivedScheduledToken event (step 394 in FIG. 35). The standard state machine 78 transitions to the WaitingForNSSendCompleteHoldingToken state and replaces the NonscheduledToken with the ReceivedScheduledToken (step 396 in FIG. 35). The nonscheduled send completes, the buffer is returned, the TST is set and the standard state machine 78 transitions to the WaitingForBlock state (step 398 in FIG. 35).

Figure 36:
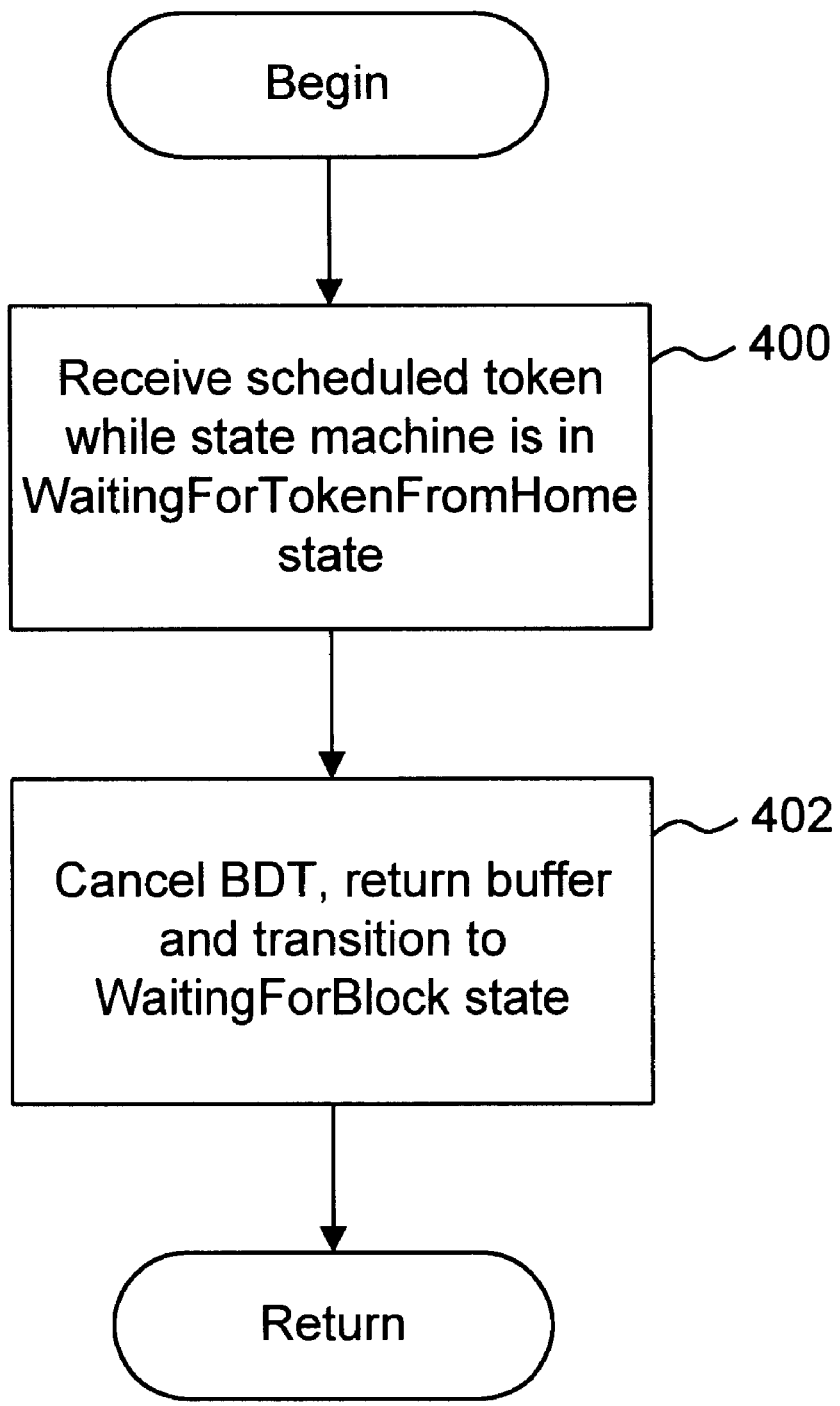
FIG. 36 is a flowchart illustrating the steps that are performed when a scheduled token is received at the standard state machine while the standard state machine is in the WaitingForTokenFromHome state.

Another unusual circumstance is illustrated in FIG. 36. In particular, a scheduled token may be received while the standard state machine 78 is in the WaitingForTokenFromHome state (step 400 in FIG. 36). In response, the BDT is canceled, the buffer is returned and the standard state machine 78 transitions to the WaitingForBlock state (step 402 in FIG. 36).

Figure 37:
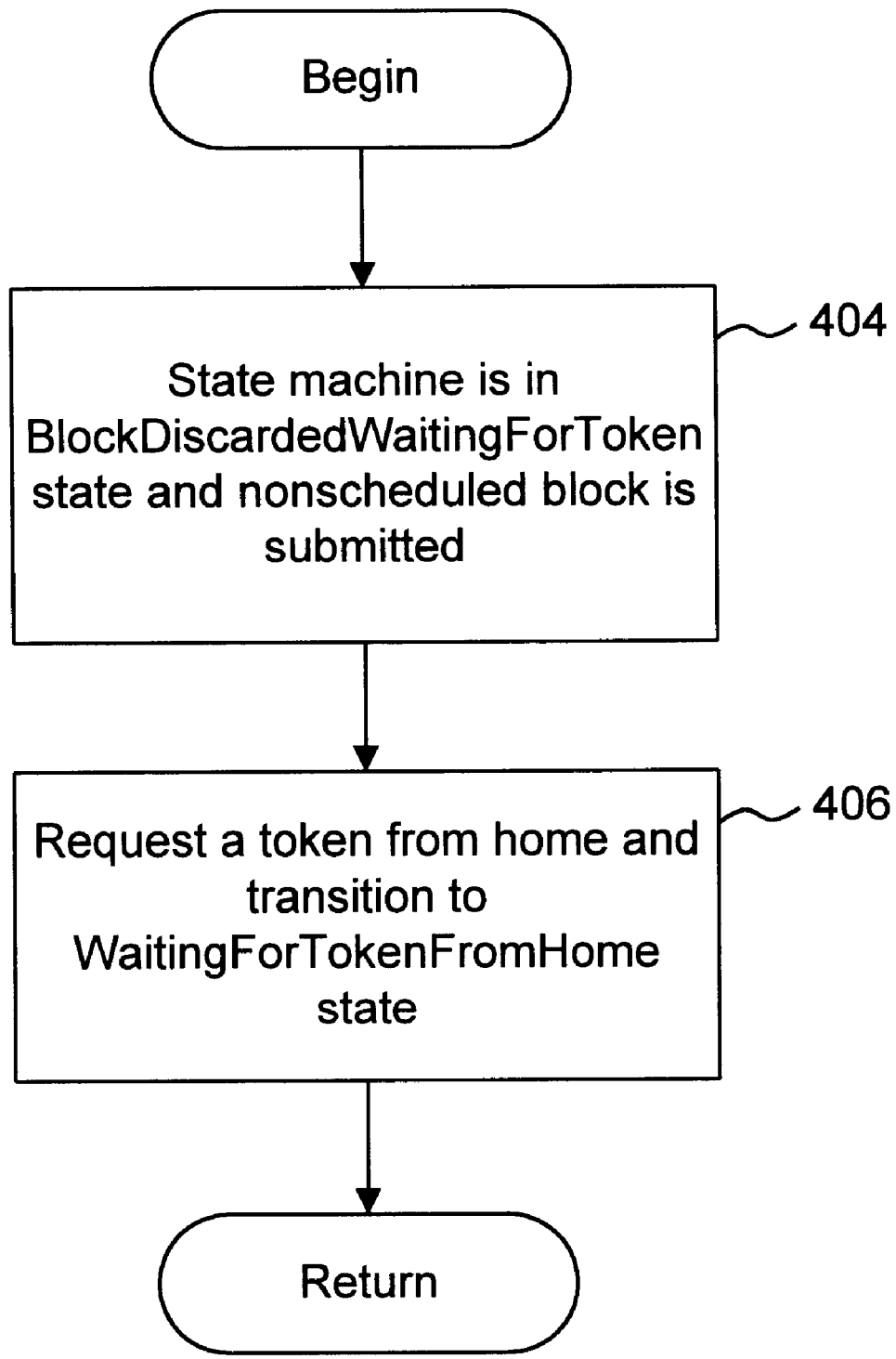
FIG. 37 is a flowchart illustrating the steps that are performed when a nonscheduled block is submitted to the standard state machine while the standard state machine is in a BlockDiscardedWaitingForToken state.

A final scenario is illustrated in the flowchart of FIG. 37. The standard state machine 78 is in the BlockDiscardedWaitingForToken state when a nonscheduled block is submitted (step 404 in FIG. 37). The standard state machine 78 disregards that it was waiting to generate a scheduled token, requests a token from the home node and transitions to the WaitingForTokenFromHome state (step 406 in FIG. 37).

While the present invention has been described with reference to a preferred embodiment thereof, those skilled in the art will appreciate the various changes in form and detail may be made without departing from the intended scope of the invention as defined in the appended claims. For example, the present invention need not be implemented using state machines; rather, other implementations are equally viable. In addition, the present invention need not be practiced on a system architecture like that depicted in FIG. 1. Other system architectures may be used to practice the present invention. Furthermore, the token need not have the data structure format shown in FIG. 2. Instead, the token may take the form of a message or may take the form of alternative data structures with different formats.

TABLE 1

APPENDIX
State Table for ScheduledBlockSubmit, 1stScheduledBlockSubmit and NonscheduledBlockSubmit

| State/Event | ScheduledBlockSubmit | 1st ScheduledBlockSubmit | NonscheduledBlockSubmit |
| --- | --- | --- | --- |
| WaitingForBlockAndToken | Set BDT, WaitingForToken | Generate Token, Send Block, Send Update PST to Home WaitingForSendComplete | Set BDT, Request Token From Home, WaitingForTokenFromHome |
| WaitingForToken | Illegal | Illegal | Illegal |
| WaitingForBlock | Cancel TST, Send Block, WaitingForSendComplete | Illegal | Illegal |
| WaitingForSendComplete | Illegal | Illegal | Illegal |
| BlockDiscardedWaitingForToken | Cancel TGT, Set BDT, WaitingForToken | Cancel TGT, Send Block, Send Update PST to Home WaitingForSendComplete | Cancel TGT, Request Token From Home, WaitingForTokenFromHome |
| WaitingForTokenFromHome | Illegal | Illegal | Illegal |
| WaitingForNonschedSendComplete | Illegal | Illegal | Illegal |
| WaitingForNSSendCompleteHoldingToken | Illegal | Illegal | Illegal |

TABLE 2

State Table for BlockDueTimerExpiry, ReceivedScheduledToken

| State/Event | BlockDueTimerExpiry | ReceivedScheduledToken |
| --- | --- | --- |
| WaitingForBlockAndToken | Illegal | Set TST, WaitingForBlock |
| WaitingForToken | Return Buffer, Set TGT, BlockDiscardedWaitingForToken | Cancel BDT, Send Block, WaitingForSendComplete |
| WaitingForBlock | Illegal | Illegal |
| WaitingForSendComplete | Illegal | Update Held Token |
| BlockDiscardedWaitingForToken | Illegal | Forward Token, WaitingForBlockAndToken |
| WaitingForTokenFromHome | Return Buffer, WaitingForBlockAndToken | Cancel BDT, Abort Block, WaitingForBlock |
| WaitingForNonschedSendComplete | Illegal | Update Token, WaitingForNSSendCompleteHoldingToken |
| WaitingForNSSendCompleteHoldingToken | Illegal | Update Held Token |

TABLE 3

State Table for ReceivedNonschedToken, TokenGenerateTimerExpiry, SendComplete

| State/Event | ReceivedNonschedToken | TokenGenerateTimerExpiry | SendComplete |
|---|---|---|---|
| WaitingForBlockAndToken | Send Token Home | Illegal | Illegal |
| WaitingForToken | Illegal | Illegal | Illegal |
| WaitingForBlock | Illegal | Illegal | Illegal |
| WaitingForSendComplete | Illegal | Illegal | Return Buffer, Forward Token To Next Sender, WaitingForBlockAndToken |
| BlockDiscardedWaitingForToken | Illegal | Generate New Token, Forward Token to Next Sender, WaitingForBlockAndToken | Illegal |
| WaitingForTokenFromHome | Cancel BDT, Send Block, WaitingForNonschedSendComplete | Illegal | Illegal |
| WaitingForNonschedSendComplete | Replace Held Token | Illegal | Return Buffer, Return Token Home, WaitingForBlockAndToken |
| WaitingForNSSendCompleteHoldingToken | Illegal | Illegal | Return Buffer, Set TST, WaitingForBlock |

TABLE 4

State Table for TokenStateTimerExpiry and HomeChange

| State/Event | TokenStaleTimerExpiry | HomeChange |
|---|---|---|
| WaitingForBlockAndToken | Illegal | No Action |
| WaitingForToken | Illegal | No Action |
| WaitingForBlock | Discard Token, WaitingForBlockAndToken | No Action |
| WaitingForSendComplete | Illegal | No Action |
| BlockDiscardedWaitingForToken | Illegal | No Action |
| WaitingForTokenFromHome | Illegal | Request Token From New Home |
| WaitingForNonschedSendComplete | Illegal | Notify New Home That Token Is Held |
| WaitingForNSSendCompleteHoldingToken | Illegal | No Action |

TABLE 5

State Table for UpdatePST and UpdateTGT

| State/Event | UpdatePST | UpdateTGT |
|---|---|---|
| WaitingForBlockAndToken | No Action | No Action |
| WaitingForToken | Cancel BDT, Return Buffer, WaitingForBlockAndToken | No Action |
| WaitingForBlock | Cancel TST, Discard Token, WaitingForBlockAndToken | Cancel TST, Discard Token, WaitingForBlockAndToken |
| WaitingForSendComplete | Invalidate Token | Invalidate Token |
| BlockDiscardedWaitingForToken | Cancel TGT, WaitingForBlockAndToken | No Action |
| WaitingForTokenFromHome | Cancel BDT, Return Buffer, WaitingForBlockAndToken | No Action |
| WaitingForNonschedSendComplete | Invalidate Token | Invalidate Token |
| WaitingForNSSendCompleteHoldingToken | Invalidate Token | Invalidate Token |

TABLE 6

Home Machine State Table for HomeTokenRequest, NonscheduledTokenHeld, TransitionTimerExpiry and HomeTokenGenTimerExpiry

| State/Event | HomeTokenRequest | NonscheduledTokenHeld | TransitionTimerExpiry | HomeTokenGenTimerExpiry |
|---|---|---|---|---|
| ScheduledMode | Set TT, Enqueue Request, WaitingToGenerate | Set HTGT, HomeWaitingForToken | Illegal | Illegal |
| WaitingToGenerate | Enqueue Request | Cancel TT, Set HTGT, HomeWaitingForToken | Generate Token, Dequeue Request, Set HTGT, Forward Token, HomeWaitingForToken | Illegal |
| HomeWaitingForToken | Enqueue Request | Illegal | Illegal | Generate Token, if queue empty HomeHoldingToken, else {Dequeue Request, Set HTGT, Forward Token} |
| HomeHoldingToken | Set HTGT, Send Token, HomeWaitingForToken | Illegal | Illegal | Illegal |

TABLE 7

Home Machine State Table for HomeReceivedToken, UpdatePST and UpdateTGT

| State/Event | HomeReceivedToken | UpdatePST | UpdateTGT |
|---|---|---|---|
| ScheduledMode | HomeHoldingToken | No Action | No Action |
| WaitingToGenerate | Cancel TT, Dequeue Request, Set HTGT, Forward Token, HomeWaitingForToken | Cancel TT, ScheduledMode | No Action |
| HomeWaitingForToken | Cancel HTGT, if queue empty HomeHoldingToken, else {Dequeue Request, Set HTGT, Forward Token} | Cancel HTGT, ScheduledMode | No Action |
| HomeHoldingToken | Illegal | ScheduledMode | Discard Token, ScheduledMode |

We claim:

1. In a computer system having data sources for outputting data, a data sink for receiving the output data, a data funnel for connecting the data sources with the data sink and a home node for regulating the outputting of data by the data sources to the data funnel, a method comprising the computer-implemented steps of:

requesting a token at a selected one of the data sources from the home node to permit the selected data source to output data to the data sink through the data funnel;

forwarding a token from the home node to selected data source; and outputting the data from the selected data source to the data sink through the data funnel after the token is received at the selected data source.

2. The method of claim 1, further comprising the step of returning the token to the home node after the outputting of the data from the selected data source is complete.

3. The method of claim 2, further comprising the step of forwarding the token to a next of the data sources from the home node so that the next data source may output data over the data funnel.

4. The method of claim 3 wherein the next data source requests the token from the home node before the token is forwarded to the next data source.

5. The method of claim 1 wherein the computer system includes additional data sources, a second data funnel for connecting the additional data sources with a second data sink and a second home node for regulating outputting of data from the data sources to the second funnel and wherein the method further comprises the steps of;

requesting a token at a given one of the data sources from the home node to permit the given data source to output data to the second data sink through the second data funnel;

forwarding a second token from the second home node to the given data source; and outputting the data from the given data source to the second data sink through the data funnel after the second token is received at the given data source.

6. The method of claim 5 wherein the outputting from the given data source and the outputting from the selected data source are concurrently performed.

7. The method of claim 1 wherein the data funnel is realized through a cell switched network.

8. The method of claim 1 wherein the selected data source holds multimedia data and outputs multimedia data to the data sink.

9. The method of claim 1 wherein the selected data source further comprises a token filter for filtering out stale tokens and wherein the method further comprises the step of passing the token through the filter to ensure that the token is not stale before outputting the data.

10. A computer-readable storage medium for use in a computer system having data sources for outputting data, a data sink for receiving the output data, a data funnel for connecting the data sources with the data sink and a home node for regulating the outputting of data by the data sources to the data funnel, said medium holding instructions for:

requesting a token at a selected one of the data sources from the home node to permit the selected data source to output data to the data sink through the data funnel;

receiving the token at the selected data source from the home node in response to the request; and outputting data at the selected data source to the data sink through the data funnel after the token is received.

11. A computer system, comprising:
   data sources for outputting data;
   a first data sink for receiving data that is output from the data sources;
   a first data funnel for connecting the data sources with the first data sink; and
   a home node for receiving a request from a selected one of the data sources for a first token and in response, forwarding the first token to the selected data source so that the selected data source may output a data block that is destined to the data sink to the first data funnel.

12. The computer system of claim 11, further comprising:
   a second data funnel for connecting selected ones of the data sources with a second data sink; and
   a second home node for receiving a request from a given one of the data sources for a second token and in response, forwarding the second token to the given data source so that the given data source may output a data block that is destined to the second data funnel.

13. The computer system of claim 11 wherein the computer system is a distributed system.

14. The computer system of claim 13 wherein each of the data sources is a separate data server machine.

15. The computer system of claim 13 wherein the home node is a separate computer.

16. The computer system of claim 11 wherein the home node is a separate computer.

17. The computer system of claim 11 wherein the data sources are multimedia data servers.

18. The computer system of claim 11 wherein the multipoint to point data connection is realized through a virtual circuit switched network.

19. The computer system of claim 11 wherein the network is an asynchronous transfer mode (ATM) network.

20. In a computer system having a plurality of data servers that are connected to a client via a data funnel, a method comprising the computer-implemented steps of:
   operating in a scheduled mode of operation such that data blocks are output from the data servers to the data funnel in a sequence according to a predetermined schedule; and
   operating in a nonscheduled mode of operation such that data blocks are output in a nonscheduled fashion where each data server must request and receive permission to output data before the data may be output to the data server.

21. The method of claim 20 wherein the data blocks that are output in scheduled mode are striped across the data servers such that consecutive ones of the data blocks are stored on different ones of the data servers.

22. The method of claim 20 wherein when the system is operating in scheduled mode, a token is passed to each data server when it is scheduled to output one of the data blocks.

23. The method of claim 20 wherein when operating in nonscheduled mode each data server must request and receive a token before the data server can output a data block to the data funnel.

24. A computer system, comprising:
   data servers;
   a client of the data servers;
   a data funnel for passing data from the data servers to the client;
   a scheduled mode component for scheduling the data servers so that data blocks from the data servers are output in a sequence to the data funnel to be delivered to the client according to a schedule; and
   a nonscheduled mode component for enabling the data servers to output data blocks that are destined to the client to the data funnel in a nonscheduled fashion wherein each data server must request and receive permission to output a data block before the data block is output by the data server.

25. A computer-readable storage medium for use in a computer system having data servers that are connected to a client via a data funnel, said medium holding instructions for a selected one of the data servers for:
   operating the selected data server in a scheduled mode such that the selected data server outputs a data block of a data sequence to the data funnel according to a schedule so that the data block is delivered to the client; and
   operating the selected data server in a nonscheduled mode such that the selected data server outputs at least one nonscheduled data block to the data funnel destined for the client in a nonscheduled fashion where the selected data server had to request and receive permission to output the nonscheduled data block before outputting the nonscheduled data block.

26. A computer-readable storage medium for use in a computer system having data servers connected to a client and a home node for regulating outputting out data from the data servers to the client, said medium holding instructions for the home node for:
   receiving a request for a token from a selected data server, said token enabling a data server to output data to the client in a nonscheduled fashion; and
   in response to the request, forwarding the token to the selected data server.

27. The computer-readable storage medium of claim 26 wherein the medium also holds instructions for receiving the token back from the selected data server.

28. The computer-readable storage medium of claim 26 wherein the medium also holds instructions for transitioning into a scheduled mode of operation where the home node acts as a data server.

29. In a computer system having a plurality of data output components for outputting data to a connection mechanism that connects that data output components to a destination, a method comprising the steps of:
   awaiting arrival of a token at a given one of data output components for a predetermined period of time;
   where the token fails to arrive within the predetermined period of time, generating a new token at the given data output component; and
   using the new token, outputting data from the given data output component to the connection mechanism to the destination.

30. A computer-readable storage medium for use in a computer system that has a plurality of data output components for outputting data to a connection mechanism that connects the data output components to a destination, said medium holding instructions for:
   awaiting arrival of a token at a given one of data output components for a predetermined period of time;
   where the token fails to arrive within the predetermined period of time, generating a new token at the given data output component; and
   using the new token, outputting data from the given data output component to the connection mechanism to the destination.

31. In a computer system having a controller and data servers for outputting data to destinations, a method comprising the computer-implemented steps of:

providing a control mechanism on a selected one of the data servers for controlling operation of the selected server;

maintaining a play start time value at the selected data server, said play start time value indicating a time at which a most recent play request from one of the destinations to receive data output by the data servers was received by the controller;

receiving a scheduling token at the selected data server, said token holding scheduling information for outputting data by the selected data server, including a new play start time; and in response to receiving the token, updating the play start time value at the selected server to have the new play start time held in the token.

32. A computer-readable storage medium for use in a computer system having a controller and data servers for outputting data to destinations, said data servers including a selected data server that has a control mechanism for controlling operation of the selected server, said medium holding instructions for performing the steps of:

maintaining a play start time value at the selected data server, said play start time value indicating a time at which a most recent play request from one of the destinations to receive data output by the data servers was received by the controller;

receiving a scheduling token at the selected data server, said token holding scheduling information for outputting data by the selected data server, including a new play start time; and in response to receiving the token, updating the play start time value at the selected server to have the new play start time held in the token.

* * * * *